United States Patent
Ly

(10) Patent No.: US 10,757,583 B2
(45) Date of Patent: Aug. 25, 2020

(54) UPLINK-BASED POSITIONING REFERENCE SIGNALING IN MULTI-BEAM SYSTEMS

(71) Applicant: QUALCOMM Incorporated, San Diego, CA (US)

(72) Inventor: Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 16/058,986

(22) Filed: Aug. 8, 2018

(65) Prior Publication Data
US 2019/0053071 A1 Feb. 14, 2019

Related U.S. Application Data

(60) Provisional application No. 62/543,521, filed on Aug. 10, 2017.

(51) Int. Cl.
*H04W 16/18* (2009.01)
*H04W 16/28* (2009.01)
(Continued)

(52) U.S. Cl.
CPC .......... *H04W 16/28* (2013.01); *H04B 7/0617* (2013.01); *H04B 7/0695* (2013.01);
(Continued)

(58) Field of Classification Search
None
See application file for complete search history.

(56) References Cited

U.S. PATENT DOCUMENTS

| 9,907,031 B2 * | 2/2018 | Chen | H04W 52/16 |
| 2004/0038684 A1 * | 2/2004 | Sugaya | H04W 72/0446 |
| | | | 455/450 |

(Continued)

OTHER PUBLICATIONS

Catt: "NR Power Control Framework," 3GPP Draft; R1-1710043 Power Control Framework, 3rd Generation Partnership Project (3GPP), Mobile Competence Centre; 650, Route Des Lucioles; F-06921 Sophia-Antipolis Cedex; France, vol. RAN WG1, No. Qingdao. China; Jun. 27, 2017-Jun. 30, 2017, Jun. 26, 2017 (Jun. 26, 2017). XP051299268, 14 pages, Retrieved from the Internet: URL: http://www.3gpp.org/ftp/Meetings_3GPP_SYNC/RAN1/Docs/ [retrieved on Jun. 26, 2017].

(Continued)

*Primary Examiner* — Bunjob Jaroenchonwanit
(74) *Attorney, Agent, or Firm* — Thien T. Nguyen

(57) ABSTRACT

Methods, systems, and devices for wireless communication are described. A user equipment (UE) may identify a beam correspondence between a set of synchronization signals transmitted by a base station and an uplink positioning reference signal. The UE may receive a synchronization signal from a base station and determine a transmit beam for the UE to use to transmit the uplink positioning reference signal based on the received synchronization signal and the identified beam correspondence. The UE may then transmit the uplink positioning reference signal using the determined transmit beam. A base station may identify a beam correspondence between a set of synchronization signals and an uplink positioning reference signal, and transmit an indication of the beam correspondence. The base station may then receive the uplink positioning reference signal from a UE based on the transmitted indication of the beam correspondence.

30 Claims, 15 Drawing Sheets

(51) Int. Cl.
*H04L 5/00* (2006.01)
*H04W 52/14* (2009.01)
*H04B 7/06* (2006.01)
*H04W 72/04* (2009.01)
*H04W 52/24* (2009.01)
*H04B 7/08* (2006.01)
*H04W 56/00* (2009.01)

(52) U.S. Cl.
CPC ............ *H04B 7/088* (2013.01); *H04L 5/0025* (2013.01); *H04L 5/0048* (2013.01); *H04W 52/146* (2013.01); *H04W 52/242* (2013.01); *H04W 56/00* (2013.01); *H04W 72/042* (2013.01); *H04L 5/0094* (2013.01); *H04W 52/245* (2013.01); *H04W 56/0015* (2013.01); *H04W 72/046* (2013.01)

(56) References Cited

U.S. PATENT DOCUMENTS

| | | | | |
|---|---|---|---|---|
| 2014/0213315 | A1* | 7/2014 | Kim | H04W 52/325 455/522 |
| 2016/0323831 | A1* | 11/2016 | Ahn | H04B 7/0689 |
| 2017/0078977 | A1* | 3/2017 | Park | H04W 52/146 |
| 2017/0251436 | A1* | 8/2017 | Chen | H04W 52/16 |
| 2017/0303220 | A1* | 10/2017 | Sadeghi | H04L 5/0053 |
| 2017/0366377 | A1* | 12/2017 | Papasakellariou | H04L 1/0026 |
| 2018/0049137 | A1* | 2/2018 | Li | H04B 17/309 |
| 2018/0092064 | A1* | 3/2018 | Ryu | H04W 48/12 |
| 2018/0206132 | A1* | 7/2018 | Guo | H04W 16/28 |
| 2018/0220399 | A1* | 8/2018 | Davydov | H04L 1/0026 |
| 2018/0324615 | A1* | 11/2018 | Davydov | H04W 24/08 |
| 2018/0324708 | A1* | 11/2018 | Cheng | H04L 5/0048 |
| 2018/0352561 | A1* | 12/2018 | Barabell | H04B 17/318 |
| 2018/0368081 | A1* | 12/2018 | Akkarakaran | H04W 52/146 |
| 2019/0037498 | A1* | 1/2019 | Tseng | H04W 52/0238 |
| 2019/0081673 | A1* | 3/2019 | Athley | H04B 7/088 |
| 2019/0174423 | A1* | 6/2019 | Zhang | H04B 7/0617 |
| 2019/0190576 | A1* | 6/2019 | Chen | H04B 7/0615 |
| 2019/0215119 | A1* | 7/2019 | Kim | H04L 1/06 |
| 2019/0215782 | A1* | 7/2019 | Lee | H04L 1/00 |
| 2019/0230696 | A1* | 7/2019 | Kim | H04W 72/12 |
| 2019/0268862 | A1* | 8/2019 | Dai | H04W 72/044 |

OTHER PUBLICATIONS

Huawei, et al: "Discussion on UL SRS transmission power," 3GPP Draft; R1-1710459, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 26, 2017 (Jun. 26, 2017). XP051299670, 4 pages, Retrieved from the Internet: URL: http://www.3gpp.org/ftp/Meetings_3GPP_SYNC/RAN1/Docs/ [retrieved on Jun. 26, 2017].

International Search Report and Written Opinion—PCT/US2018/046096—ISA/EPO—dated Oct. 31, 2018.

Samsung: "UL beam management," 3GPP Draft; R1-1707952, 3rd Generation Partnership Project (3GPP), Mobile Competence Centre; 650, Route Des Lucioles; F-06921 Sophia-Antipolis Cedex; France, vol. RAN WG1. No. Hangzhou. China; May 15, 2017-May 19, 2017, May 14, 2017 (May 14, 2017). XP051273150, 6 pages, Retrieved from the Internet: URL: http://www.3gpp.org/ftp/ Meetings 3GPP_SYNC/RAN1/Docs/ [retrieved on May 14, 2017].

Zte: "UL beam management for NR MIMO," 3GPP Draft; R1-1710184 UL Beam Management for NR MIMO, 3rd Generation Partnership Project (3GPP), Mobile Competence Centre; 650, Route Des Lucioles; F-06921 Sophia-Anti Polis Cedex; France, vol. RAN WG1, No. Qingdao, P.R. China; Jun. 27, 2017-Jun. 30, 2017, Jun. 26, 2017 (Jun. 26, 2017), XP051299408, 8 pages, Retrieved from the Internet: URL: http://www.3gpp.org/ftp/Meetings_3GPP_SYNC/RAN1/Docs/ [retrieved on Jun. 26, 2017].

* cited by examiner

UPLINK-BASED POSITIONING REFERENCE SIGNALING IN MULTI-BEAM SYSTEMS

CROSS REFERENCES

The present Application for Patent claims benefit of U.S. Provisional Patent Application No. 62/543,521 by Ly, entitled "UPLINK-BASED POSITIONING REFERENCE SIGNALING IN MULTI-BEAM SYSTEMS," filed Aug. 10, 2017, assigned to the assignee hereof, and expressly incorporated by reference in its entirety.

BACKGROUND

The following relates generally to wireless communication, and more specifically to uplink-based positioning reference signaling in multi-beam systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a device such as a base stations or a UE may communicate directionally using beamforming techniques. In such systems, beamforming may involve the use of multiple antenna elements configured to form a beam in a particular direction. In some cases, wireless systems may support both single and multi-beam system operations. For example, single beam operations may be enabled for lower frequency bands (e.g. below 3 gigahertz (GHz)) while multi-beam operations may be enabled for higher frequency bands (between 3 and 6 GHz or higher).

Positioning support may be utilized for services of a wireless communications system (e.g., emergency services). However, in some wireless communications systems, UE positioning may not be supported and as a result, the UE may resort to alternative or legacy systems capable of supporting UE positioning to provide services that rely on UE positioning. Uplink-based positioning, also known as network-based positioning, may include a UE sending a position reference signal (PRS) or reference signal such as a sounding reference signal (SRS) as an uplink transmission to support positioning procedures. Downlink-based positioning, also known as UE-based positioning, may include a base station sending a PRS in the downlink to support the positioning procedures. Such techniques may be sufficient for legacy wireless communications systems, however, more efficient techniques for uplink-based positioning in multi-beam systems may be beneficial.

SUMMARY

The described techniques relate to improved methods, systems, devices, or apparatuses that support uplink-based positioning reference signaling in multi-beam systems. Generally, the described techniques provide for uplink-based positioning reference signaling. A user equipment (UE) may determine a beam correspondence between a set of synchronization signals (e.g., which may be transmitted by a base station) and a set of transmit beams of the UE. The UE may receive a synchronization signal from the base station, and based on the beam correspondence, determine a transmit beam associated with the synchronization signal or a receive beam used to receive the synchronization signal. The UE may use the determined transmit beam to transmit an uplink positioning reference signal (UPRS) to the base station. This may allow the UE to avoid beam sweeping through a set of transmit beams in order to transmit the UPRS to the base station.

A base station may identify a beam correspondence between a set of synchronization signals that may be transmitted by the base station and a set of transmit beams of a UE. The base station may transmit an indication of the beam correspondence to the UE and subsequently transmit a synchronization signal to the UE. The base station may alternatively transmit the set of synchronization signals by beam sweeping a set of transmit beams. The base station may then receive an UPRS from the UE based at least in part on the indicated beam correspondence.

A method of wireless communication at a UE is described. The method may include identifying a beam correspondence between a set of synchronization signals and an uplink positioning reference signal, the set of synchronization signals transmitted by a base station, receiving, from the base station, a synchronization signal at the UE, determining a transmit beam for the UE to use to transmit the uplink positioning reference signal based on the received synchronization signal and the identified beam correspondence, and transmitting the uplink positioning reference signal using the determined transmit beam.

An apparatus for wireless communication is described. The apparatus may include means for identifying a beam correspondence between a set of synchronization signals and an uplink positioning reference signal, the set of synchronization signals transmitted by a base station, means for receiving, from the base station, a synchronization signal at the UE, means for determining a transmit beam for the UE to use to transmit the uplink positioning reference signal based on the received synchronization signal and the identified beam correspondence, and means for transmitting the uplink positioning reference signal using the determined transmit beam.

Another apparatus for wireless communication is described. The apparatus may include a processor, memory in electronic communication with the processor, and instructions stored in the memory. The instructions may be operable to cause the processor to identify a beam correspondence between a set of synchronization signals and an uplink positioning reference signal, the set of synchronization signals transmitted by a base station, receive, from the base station, a synchronization signal at the UE, determine a transmit beam for the UE to use to transmit the uplink positioning reference signal based on the received synchronization signal and the identified beam correspondence, and transmit the uplink positioning reference signal using the determined transmit beam.

A non-transitory computer readable medium for wireless communication is described. The non-transitory computer-readable medium may include instructions operable to cause a processor to identify a beam correspondence between a set of synchronization signals and an uplink positioning reference signal, the set of synchronization signals transmitted by a base station, receive, from the base station, a synchronization signal at the UE, determine a transmit beam for the UE to use to transmit the uplink positioning reference signal based on the received synchronization signal and the identified beam correspondence, and transmit the uplink positioning reference signal using the determined transmit beam.

In some examples of the method, apparatus, and non-transitory computer-readable medium described above, identifying the beam correspondence includes: receiving, from the base station, a beam correspondence configuration that indicates the beam correspondence.

In some examples of the method, apparatus, and non-transitory computer-readable medium described above, identifying the beam correspondence includes: receiving beam correspondence configurations from multiple base stations, where each beam correspondence configuration indicates the beam correspondence for a respective base station of the multiple base stations.

Some examples of the method, apparatus, and non-transitory computer-readable medium described above may further include processes, features, means, or instructions for determining a transmission power for the uplink positioning reference signal based on the received synchronization signal.

In some examples of the method, apparatus, and non-transitory computer-readable medium described above, determining the transmit beam includes: identifying a receive beam used for receiving the synchronization signal and determining an uplink transmit beam that corresponds to the receive beam.

In some examples of the method, apparatus, and non-transitory computer-readable medium described above, receiving the synchronization signal includes: monitoring for the synchronization signal over a set of resources corresponding to a serving cell of the UE, where the identified receive beam corresponds to the serving cell.

In some examples of the method, apparatus, and non-transitory computer-readable medium described above, identifying the receive beam includes: receiving the set of synchronization signals over a set of receive beams and selecting at least one receive beam from the set of receive beams.

Some examples of the method, apparatus, and non-transitory computer-readable medium described above may further include processes, features, means, or instructions for measuring the set of synchronization signals, where the at least one receive beam may be selected based on the measurements of the set of synchronization signals.

Some examples of the method, apparatus, and non-transitory computer-readable medium described above may further include processes, features, means, or instructions for receiving, from the base station, a set of power offsets for the UE. Some examples of the method, apparatus, and non-transitory computer-readable medium described above may further include processes, features, means, or instructions for determining a transmission power for the uplink positioning reference signal based on the received set of power offsets.

Some examples of the method, apparatus, and non-transitory computer-readable medium described above may further include processes, features, means, or instructions for determining a path loss based on a measurement of the received synchronization signal. Some examples of the method, apparatus, and non-transitory computer-readable medium described above may further include processes, features, means, or instructions for determining a transmission power for the uplink positioning reference signal based on the determined path loss.

In some examples of the method, apparatus, and non-transitory computer-readable medium described above, transmitting the uplink positioning reference signal includes: transmitting the uplink positioning reference signal over a plurality of transmit beams including the determined transmit beam.

In some examples of the method, apparatus, and non-transitory computer-readable medium described above, determining the transmit beam includes: determining time-frequency resources for the UE to use to transmit the uplink positioning reference signal based on the beam correspondence, the uplink positions reference signal transmitted using the determined time-frequency resources.

Some examples of the method, apparatus, and non-transitory computer-readable medium described above may further include processes, features, means, or instructions for receiving, from the base station, an indication of the beam correspondence, where the indication may be carried in a master information block (MIB), or a system information block (SIB), or a physical downlink control channel (PDCCH), or a physical downlink shared channel (PDSCH), or a radio resource control (RRC) message, or a combination thereof.

In some examples of the method, apparatus, and non-transitory computer-readable medium described above, the synchronization signal includes a primary synchronization signal (PSS), or a secondary synchronization signal (SSS), or a physical broadcast channel (PBCH), or a demodulation reference signal (DMRS), or a combination thereof.

In some examples of the method, apparatus, and non-transitory computer-readable medium described above, the uplink positioning reference signal includes a sounding reference signal (SRS), or a physical random access channel (PRACH), or another type of reference signal.

A method of wireless communication at a base station is described. The method may include identifying a beam correspondence between a set of synchronization signals and an uplink positioning reference signal, transmitting an indication of the beam correspondence, transmitting the set of synchronization signals using one or more transmit beams, and receiving the uplink positioning reference signal from a UE based on the transmitted indication of the beam correspondence.

An apparatus for wireless communication is described. The apparatus may include means for identifying a beam correspondence between a set of synchronization signals and an uplink positioning reference signal, means for transmitting an indication of the beam correspondence, means for transmitting the set of synchronization signals using one or more transmit beams, and means for receiving the uplink positioning reference signal from a UE based on the transmitted indication of the beam correspondence.

Another apparatus for wireless communication is described. The apparatus may include a processor, memory in electronic communication with the processor, and instructions stored in the memory. The instructions may be operable to cause the processor to identify a beam correspondence between a set of synchronization signals and an uplink positioning reference signal, transmit an indication of the beam correspondence, transmit the set of synchronization signals using one or more transmit beams, and receive the uplink positioning reference signal from a UE based on the transmitted indication of the beam correspondence.

A non-transitory computer readable medium for wireless communication is described. The non-transitory computer-readable medium may include instructions operable to cause a processor to identify a beam correspondence between a set of synchronization signals and an uplink positioning reference signal, transmit an indication of the beam correspondence, transmit the set of synchronization signals using one or more transmit beams, and receive the uplink positioning reference signal from a UE based on the transmitted indication of the beam correspondence.

In some examples of the method, apparatus, and non-transitory computer-readable medium described above, transmitting the set of synchronization signals includes: transmitting the set of synchronization signals using a set of transmit beams, where the uplink positioning reference signal may be received over a receive beam that corresponds to at least one beam of the set of transmit beams.

In some examples of the method, apparatus, and non-transitory computer-readable medium described above, receiving the uplink positioning reference signal includes: monitoring resources that correspond to the uplink positioning reference signal based on the beam correspondence.

In some examples of the method, apparatus, and non-transitory computer-readable medium described above, receiving the uplink positioning reference signal includes: measuring for the uplink positioning reference signal across a set of receive beams based on the beam correspondence.

In some examples of the method, apparatus, and non-transitory computer-readable medium described above, the indication of the beam correspondence may be transmitted via of a MIB, or a SIB, or a PDCCH, or a PDSCH, or an RRC message, or a combination thereof.

Some examples of the method, apparatus, and non-transitory computer-readable medium described above may further include processes, features, means, or instructions for transmitting a set of power offsets to the UE, the set of power offsets indicating a transmission power offset for the uplink positioning reference signal.

In some examples of the method, apparatus, and non-transitory computer-readable medium described above, the set of power offsets may be based on at least one of the set of synchronization signals, or a frequency band used for transmission of the uplink positioning reference signal, or a duplexing mode used for transmission of the uplink positioning reference signal, or a combination thereof.

In some examples of the method, apparatus, and non-transitory computer-readable medium described above, the set of power offsets may be transmitted via a MIB, or a SIB, or a PDCCH, or a PDSCH, or an RRC message, or a combination thereof.

In some examples of the method, apparatus, and non-transitory computer-readable medium described above, the set of synchronization signals includes a PSS, or an SSS, or a PBCH, or a DMRS, or a combination thereof.

In some examples of the method, apparatus, and non-transitory computer-readable medium described above, transmitting the indication of the beam correspondence includes: transmitting the indication of the beam correspondence to a second base station.

In some examples of the method, apparatus, and non-transitory computer-readable medium described above, the uplink positioning reference signal includes an SRS, or a PRACH, or another type of reference signal.

DETAILED DESCRIPTION

In some wireless communications systems, such as new radio (NR) systems, devices may communicate using directional transmissions (e.g., beams) by enabling multiple antenna elements to form a beam in a particular direction. These wireless systems may support positioning services, where a user equipment (UE) may transmit positioning reference signals to one or more base stations. The positioning reference signals may be used by a base station to determine a geographical location of the UE. In some cases, a UE may be unaware of a particular location of a base station, such as when a gap in communications occurs while a UE is moving. As the UE may not know the direction in which to transmit a positioning reference signal to the base station, the UE may, in some cases, select a transmit beam that may be unsuitable for reception at the base station. Thus, the techniques described herein provide for coordinating positioning reference signal transmissions from a UE.

The base station may identify a beam correspondence to transmit to a UE that may allow the UE and the serving base station and/or other base stations to coordinate transmission and reception of a positioning reference signal. The beam correspondence may indicate a beam configuration to be used for transmission of an uplink positioning reference signal based on which synchronization signal was received (or which receive beam was used by the UE to receive the synchronization signal from a base station. Once the UE receives the synchronization signal from the base station, the UE may determine the beam configuration used to receive the synchronization signal and, based on the received beam correspondence, determine the uplink beam configuration to use for transmitting the positioning reference signal.

Aspects of the disclosure are initially described in the context of wireless communications systems. Aspects are also described with reference to a process flow. Aspects of the disclosure are further illustrated by and described with reference to apparatus diagrams, system diagrams, and flowcharts that relate to uplink-based positioning reference signaling in multi-beam systems.

Figure 1:
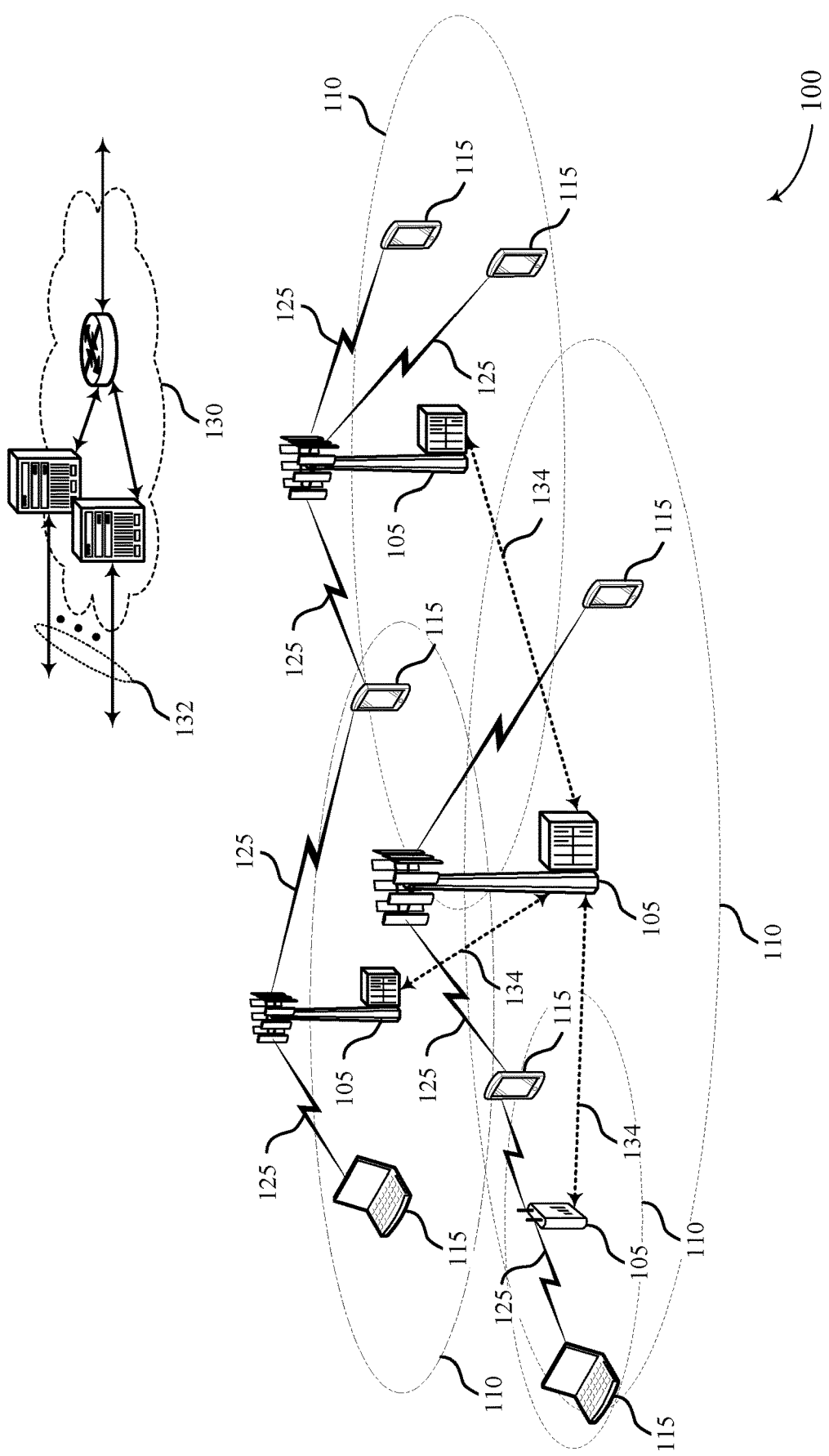
FIG. 1 illustrates an example of a wireless communications system that supports uplink-based positioning reference signaling in multi-beam systems in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 (or other network entity) may define a beam correspondence between one or more synchronization signals (e.g., primary synchronization signal (PSS) (such as a NR-PSS), secondary synchronization signal (SSS) (such as a NR-SSS), demodulation reference signal (DMRS) (such as a NR physical broadcast channel (PBCH) DMRS)) and an uplink positioning reference signal (UPRS). The beam correspondence may specify a relationship between one or more beams used for receiving (e.g., by the UE 115) at least one of the synchronization signals and one or more transmit beams to be used for transmission (e.g., by the UE 115) of the UPRS. There may be different beam correspondence configurations for uplink-based positioning. Such beam correspondence configurations may define beam correspondence at both a UE 115 and a base station 105, beam correspondence at a UE 115 only, beam correspondence at a base station 105 only, or no beam correspondence between a UE 115 and a base station 105. The beam correspondence may be signaled in system information (e.g., by an indication carried in a master information block (MIB), system information block (SIB), remaining minimum system information (RMSI), other system information (OSI), etc.). Further, in some examples, the transmit power for the UPRS may be offset or may depend on measurements of synchronization signals. In some examples, transmit power may be indicated to the UE 115 (e.g., in a message transmitted by base station 105 to UE 115).

Figure 2:
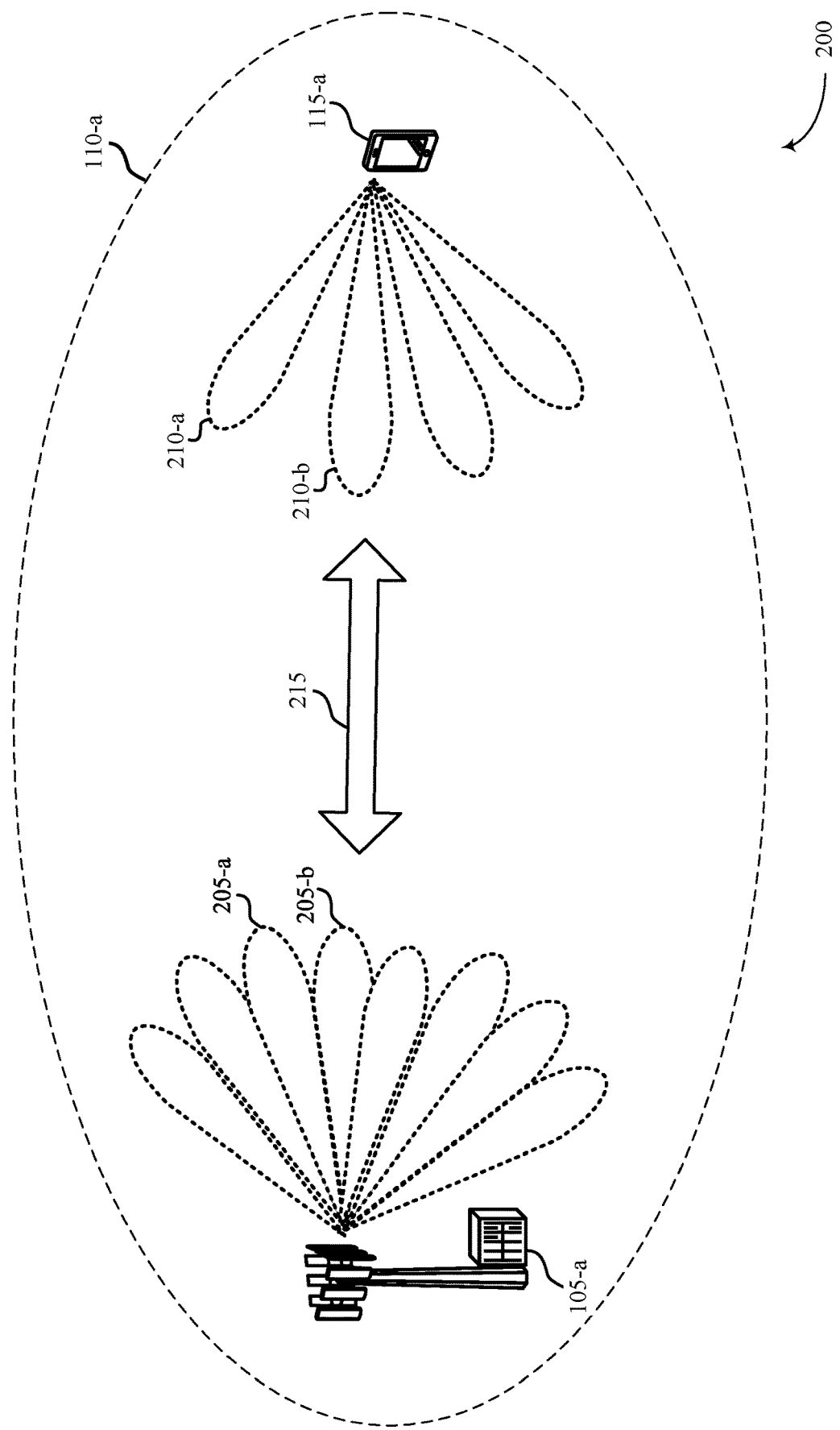
FIG. 2 illustrates an example of a wireless communications system that supports uplink-based positioning reference signaling in multi-beam systems in accordance with aspects of the present disclosure.

FIG. 2 illustrates an example of a wireless communications system 200 that supports uplink-based positioning reference signaling in multi-beam systems in accordance with various aspects of the present disclosure. In some examples, wireless communications system 200 may implement aspects of wireless communications system 100. Wireless communications system 200 may include a base station 105-a that supports communication with a UE 115-a over coverage area 110-a. Base station 105-a and UE 115-a may communicate via communication link 215.

In some examples, the base station 105-a may use beamforming techniques to communicate with the UE 115-a. For instance, the base station 105-a may transmit a synchronization signal to the UE 115-a using one or more transmit beams 205. Each transmit beam 205 may use different time-frequency resources and the formation of the transmit beam 205 may be based on an antenna configuration at the base station 105-a. The UE 115-a may also utilize beamforming techniques in order to receive one or more synchronization signals transmitted by base station 105-a. For example, the UE 115-a may use multiple antennas to form a receive beam 210 capable of receiving one or more synchronization signals transmitted by the base station 105-a. The formation of each receive beam 210 may be based on an antenna configuration at the UE 115-a.

Base station 105-a may define a beam correspondence between the base station 105-a and the UE 115-a. The beam correspondence may be defined with respect to synchronization signals (e.g., transmitted by the base station 105-a) and a UPRS (e.g., to be transmitted by the UE 115-a based in part on received synchronization signals). The beam correspondence may be base station specific, UE specific, cell specific, or specific to a group of UEs. Further, there may be different beam correspondence configurations defined for uplink-based positioning. Such beam correspondence configurations may include beam correspondence at both the UE 115-a and the base station 105-a, beam correspondence at the UE 115-a only, beam correspondence at the base station 105-a only, or no beam correspondence between the base station 105-a and the UE 115-a.

In some cases, the base station 105-a may use one or more transmit beams 205 to transmit an indication of the beam correspondence to the UE 115-a. In other cases, the base station 105-a may transmit the indication of the beam correspondence without using beamforming techniques. The indication of the beam correspondence may be transmitted prior to or concurrently with the synchronization signals and in some examples, the beam correspondence may be transmitted within or indicated by system information (SIB, MIB, RMSI, OSIB, etc.). The beam correspondence may be transmitted by the base station 105-a using the same or different beam configuration than that which is used for transmitting the synchronization signals.

Based on the beam correspondence, the UE 115-a may determine an association between a receive beam 210 over which a synchronization signal is received and an uplink beam configuration over which an UPRS may be transmitted (e.g., in a case of UE 115-a and base station 105-a correspondence). Upon reception of a synchronization signal, the UE 115-a may determine the receive beam used to receive the synchronization signal (e.g., by measuring a set of synchronization signals received over a set of receive beams and determining the strongest or highest signal power). Based on the beam correspondence, the UE 115-a may determine the uplink beam configuration for transmission of UPRS.

The UE 115-a may transmit, according to the beam correspondence configuration, a UPRS based on which receive beam 210 received the synchronization signal (or the strongest synchronization signal in a case where the UE 115-a receives multiple synchronization signals from one or more base stations 105-a). In some cases, the UPRS may be transmitted on the same transmit beam over which the synchronization signal is received. For example, the UE 115-a may receive a synchronization signal from the base station 105-a over receive beam 210-a. Based on the beam correspondence, the UE 115-a may determine to transmit a UPRS over beam 210-a. Alternatively, the beam correspondence may indicate to UE 115-a to transmit over a different beam than the beam over which the synchronization signal was received, such as beam 210-b. In some examples, a set of synchronization signals may be transmitted by the base station 105-a using multiple beams (e.g., two or more of beams 205-a, 205-b, etc.) and the UE 115-a may receive multiple synchronization signals over multiple beams (e.g., two or more of beams 210-a, 210-b, etc.). Based on measurements of the received synchronization signals and the beam correspondence, the UE 115-a may determine a beam 210 to use for transmission of the UPRS. In some examples, the UPRS may be a sounding reference signal (SRS), or a physical random access channel (PRACH), or another type of reference signal, for example another type of reference signal suitable for use as an UPRS.

In some examples, the UE 115-a may not have knowledge of an antenna configuration to use for transmission of the UPRS (e.g., in a case where no beam correspondence is defined, or when beam correspondence is not received by the UE 115-a, or UE 115-a has moved). In such instances, the UE 115-a may perform a beam sweeping operation by transmitting the UPRS over multiple beams 210-a, 210-b, and so on. Additionally or alternatively, the base station 105-a may not have knowledge of a beam configuration to use for reception of the UPRS (e.g., in a case of base station only beam correspondence or no beam correspondence). In such cases, the base station 105-a may perform beam sweeping over multiple receive beams which may or may not correspond to beams 205 used for transmission of the synchronization signal(s).

For power saving mechanisms at the UE 115-a, the UE 115-a may not transition to a connected state (e.g., RRC-Connected state) to transmit a UPRS. For instance, in some cases, the UE 115-a may send a UPRS when the UE 115-a is operating in an idle mode (e.g., in RRC-Idle), such as when a positioning service is requested.

The UE 115-a may also adjust the transmission of the UPRS to maintain reliable communications with base station 105-a. For example, the transmit power for the UPRS may vary depending on measurements of received synchronization signals. In some aspects, a fixed power offset may be added into the transmit power of the UPRS. The power offset may be frequency band dependent and/or based on the duplexing mode used for transmission (e.g., TDD or FDD). Additionally or alternatively, the power offset may be signaled in system information (e.g., MIB, SIB). If a base station 105-a signals a set of power offsets to the UE 115-a, the UE 115-a may select a power offset based on the path loss computed from the synchronization signal measurement. In some cases, the UE 115-a may randomly select a power offset from among a set of power offsets when the UE 115-a transmits the UPRS. For example, UE 115-a may randomly select a power offset for each UPRS transmission.

Figure 3A:
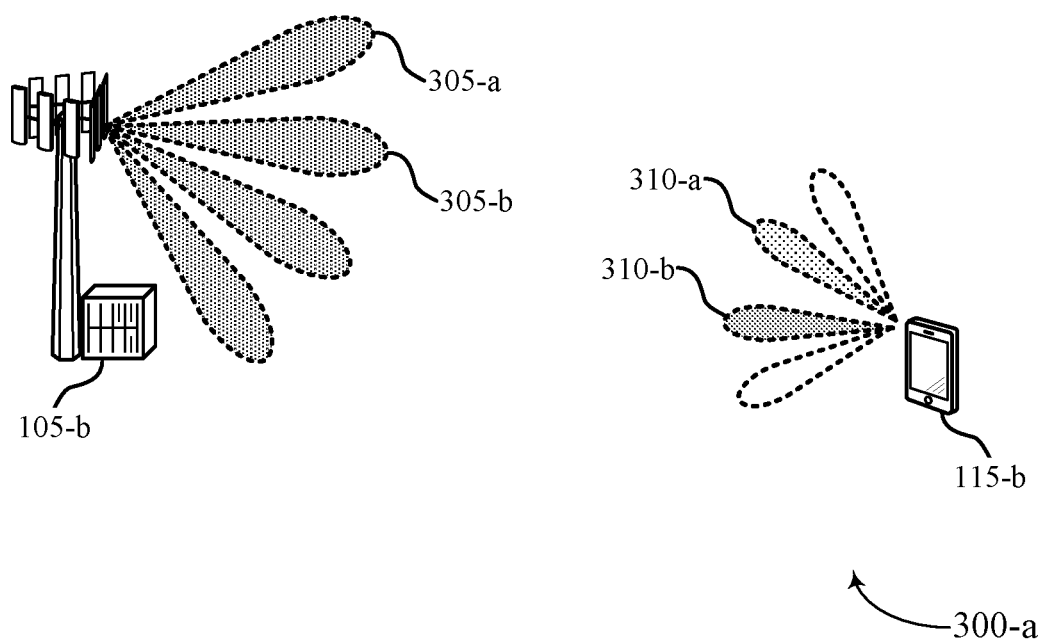
FIGS. 3A and 3B illustrate examples of wireless communications systems that support uplink-based positioning reference signaling in multi-beam systems in accordance with aspects of the present disclosure.
Figure 3B:
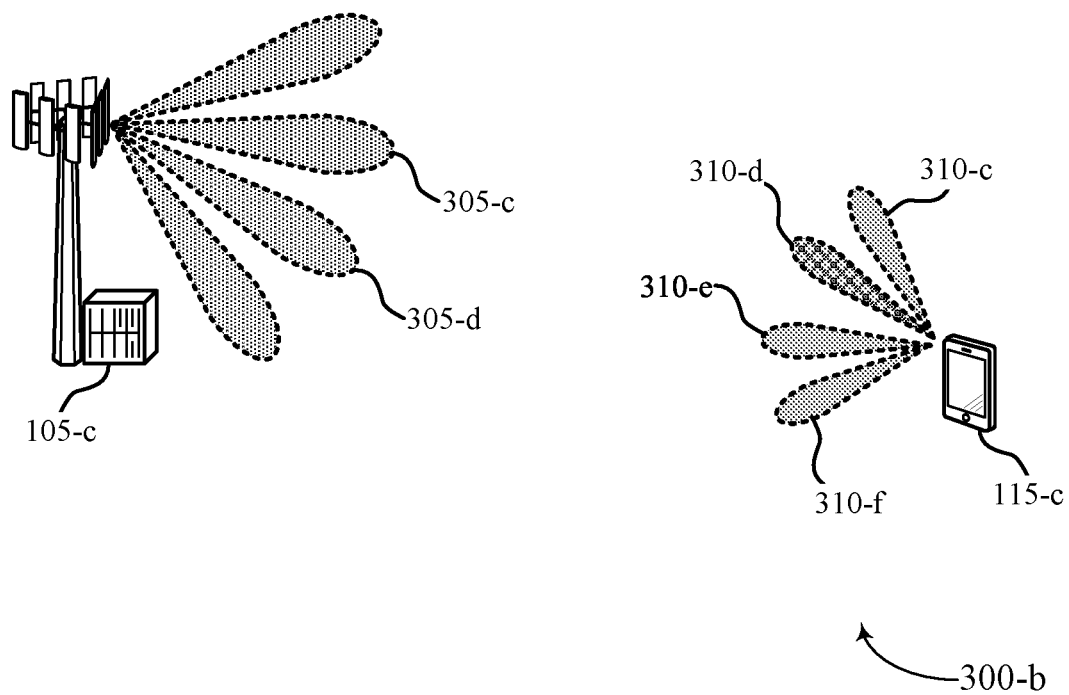

FIGS. 3A and 3B illustrate examples of a wireless communications systems 300 that supports uplink-based positioning reference signaling in multi-beam systems in accordance with various aspects of the present disclosure. In some examples, wireless communications system 300 may implement aspects of wireless communications systems 100 or 200 as described with reference to FIGS. 1 and 2.

As shown in FIG. 3A, wireless communications system 300-a includes a base station 105-b that is in communication with UE 115-b. Base station 105-b may be an example of a base station associated with a serving cell for UE 115-b. The base station 105-b may determine a beam correspondence configuration between a set of synchronization signals and a UPRS from the UE 115-b. In some cases, the base station 105-b may alternatively receive a beam correspondence configuration from a network entity such as a core network entity (e.g., an MME, an access and mobility function (AMF), etc.).

The base station 105-b may communicate the determined beam correspondence configuration to the UE 115-b, which may be transmitted within or indicated by system information. In one example, the beam correspondence configuration may indicate to the UE 115-b a beam correspondence between the base station 105-b and the UE 115-b. For instance, the beam correspondence between the base station 105-b and the UE 115-b may indicate an association between a receive beam configuration (e.g., used to form beam 310-a over which a synchronization signal is received) of the UE 115-b with transmit beam configuration of the UE 115-b (e.g., used to form beam 310-b over which a UPRS is transmitted).

In one example, the beam correspondence between the base station 105-b and the UE 115-b may indicate that the UE 115-b is to use the same beam configuration for transmitting a UPRS as is used to receive a synchronization signal from the base station 105-b. For instance, the beam correspondence may indicate to the UE 115-b to transmit a UPRS over beam 310-a, which may be the same beam used by the UE 115-b to receive a synchronization signal from the base station 105-b.

In some cases, the base station 105-b may transmit a synchronization signal using one or more beams 305 (beam 305-a, beam 305-b, etc.) to the UE 115-b. Upon receipt of the synchronization signal, the UE 115-b may determine that receive beam 310-b is associated with the strongest received synchronization signal and, based on the beam correspondence, the UE 115-b may determine the corresponding transmit beam for the UE 115-b to transmit the UPRS. In one such example, the beam correspondence may indicate that the UE 115-b use the same beam to transmit the UPRS as that which is used to receive the synchronization signal and thus, the UE 115-b may determine to transmit the UPRS via beam 310-b. In another example, the beam correspondence may indicate that the UE 115-b uses a different beam to transmit the UPRS than that which is used to receive the synchronization signal. In such instances, although the UE 115-b receives the synchronization signal via beam 310-b, the beam correspondence may be used by the UE 115-b to determine to transmit the UPRS via beam 310-b.

As shown in FIG. 3B, wireless communications system 300-b includes a base station 105-c that is in communication with UE 115-c. Base station 105-c may be an example of a base station associated with a serving cell for UE 115-c. The base station 105-b may determine a beam correspondence configuration between a set of synchronization signals (e.g., which may be transmitted by base station 105-c) and a UPRS (e.g., which may be transmitted by the UE 115-c). In some cases, the base station 105-c may alternatively receive a beam correspondence configuration from a network entity such as a core network entity (e.g., an MME, an AMF).

The base station 105-c may communicate the determined beam correspondence configuration to the UE 115-c, which may be transmitted within or indicated by system information. In one example, the beam correspondence configuration may indicate to the UE 115-c that there is no beam correspondence between the base station 105-c and the UE 115-c or that there may be beam correspondence at the base station 105-c only. In such examples, the base station 105-c may transmit a synchronization signal via one or more beams 305 to the UE 115-c. Upon receipt of the synchronization signal (e.g., over beam 310-d), the UE 115-c may, based on the beam correspondence, determine one or more of the beams 310 to use for transmission of the UPRS (e.g., beam 310-d). For example, due to there not being beam correspondence between the base station 105-c and the UE 115-c or beam correspondence only at the base station 105-c, the UE 115-c may perform beam sweeping of the UPRS over each of beams 310 (e.g., 310-c, 310-d, 310-e, 310-f). As the base station 105-c may not know which beams the UE 115-c will use for transmission of the UPRS, the base station 105-c may also beam sweep through its receive beams 305 in order to receive the UPRS.

Figure 4:
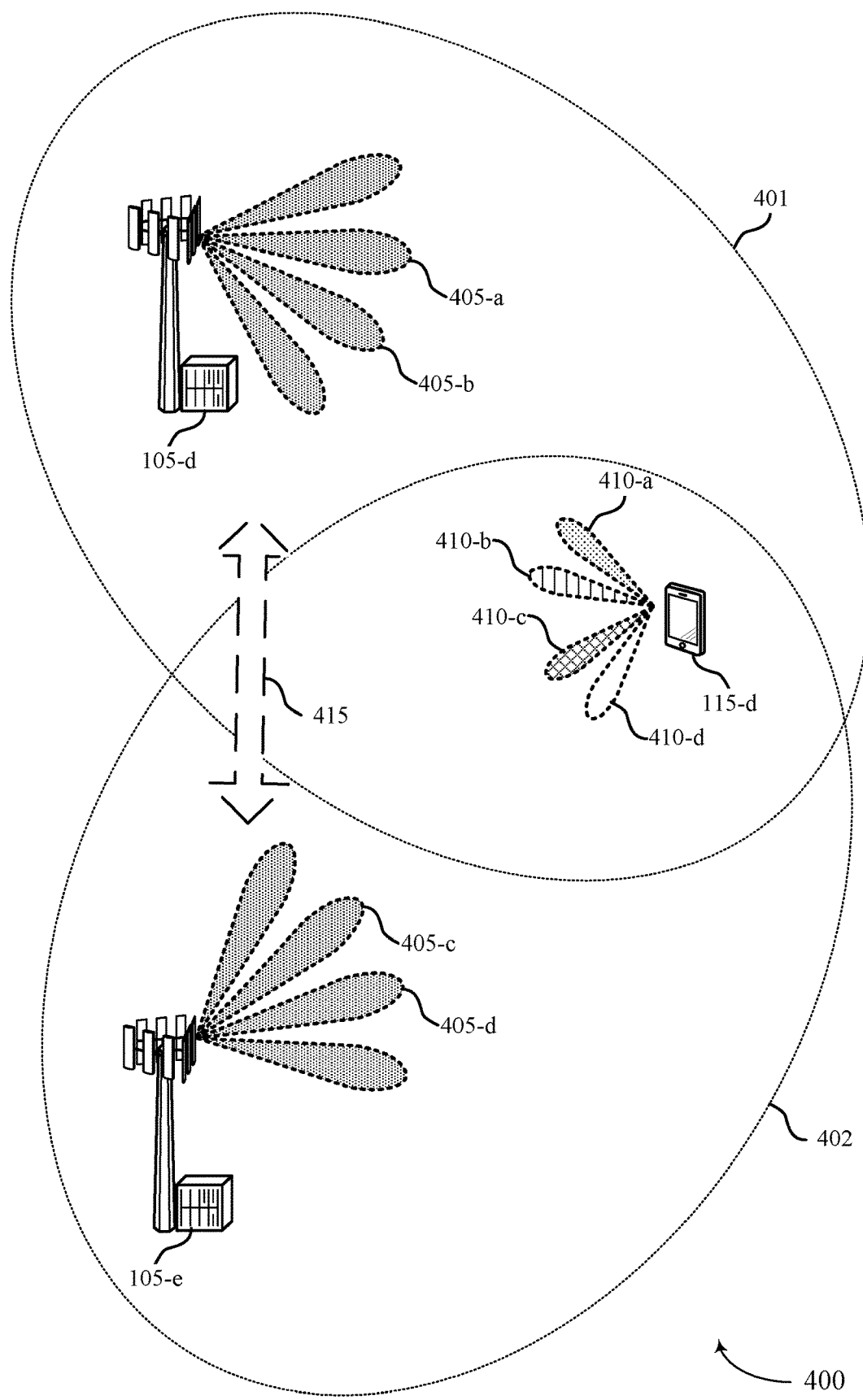
FIG. 4 illustrates an example of a wireless communications system that supports uplink-based positioning reference signaling in multi-beam systems in accordance with aspects of the present disclosure.

FIG. 4 illustrates an example of a wireless communications system 400 that supports uplink-based positioning reference signaling in multi-beam systems in accordance with various aspects of the present disclosure. In some examples, wireless communications system 400 may implement aspects of wireless communications systems 100, 200, or 300 as described with reference to FIGS. 1 through 3.

As shown in FIG. 4, wireless communications system 400 includes a base station 105-d in communication with UE 115-d. Base station 105-d may be an example of a base station associated with a serving cell 401 (e.g., a primary cell) for UE 115-d. Neighboring base station 105-e may also be in communication with UE 115-d, and may be an example of a base station associated with a secondary cell 402 for UE 115-d. In other examples, the base station 105-e may support communication for secondary cell 402, but may not be in communication with UE 115-d (e.g., the UE 115-d may not be configured to or connected with base station 105-e via secondary cell 402).

The base station 105-d may determine a beam correspondence configuration for the UE 115-d. In some examples, the base station 105-d may alternatively receive a beam correspondence configuration from a network entity or node, such as a core network entity (e.g., MME, AMF). The base station 105-d may communicate the determined beam correspondence configuration to the UE 115-d, which may be transmitted within or indicated by system information. In some cases, base station 105-e may determine a beam correspondence configuration for the UE 115-d, which may be the same or different than the beam correspondence configuration determined by base station 105-d. In some examples, the base station 105-e may alternatively receive a beam correspondence configuration from a network entity or node, such as a core network entity (e.g., MME, AMF) and the base station 105-e may communicate the determined beam correspondence configuration to the UE 115-d, which may be transmitted within or indicated by system information.

In some cases, the beam correspondence configuration may indicate to the UE 115-d to transmit a UPRS based on the beam used to receive a synchronization signal (e.g., a synchronization signal with the highest received power). For example, the base station 105-d may transmit a synchronization signal via one or more beams (e.g., beams 405-a, 405-b) or a neighboring base station 105-e may also transmit synchronization signals via one or more beams (e.g., beams 405-c, 405-d).

Upon receipt of the synchronization signal(s), the UE 115-d may measure the received power level of the synchronization signal(s) and determine to transmit multiple UPRSs (e.g., one UPRS to base station 105-d and one UPRS to base station 105-e). In one example, the UE 115-d may receive a synchronization signal from base station 105-d via receive beam 410-b. Based on the beam correspondence, the UE 115-d may determine a respective transmit beam for the UPRS. For instance, the UE 115-d may determine to transmit a UPRS to base station 105-d via beam 410-a. Further, UE 115-d may also receive a synchronization signal from base station 105-e via receive beam 410-c. Based on the beam correspondence, the UE 115-d may determine a respective transmit beam for the UPRS. For instance, the UE 115-d may determine to transmit a UPRS to base station 105-e via the same beam 410-c as used for reception of the synchronization signal or a different beam (e.g., beam 410-d).

In some cases, the UE 115-d may transmit the UPRS only to the base station 105-d associated with its serving cell 401 (and may therefore not transmit a UPRS to base station 105-e). In such instances, upon receipt of the UPRS, the base station 105-d may coordinate with any neighboring cells (e.g., base station 105-e) information related to beam 410 used to transmit the UPRS, or a receive beam 405 used by the base station 105-d used for receiving the UPRS. The information related to the beam 410 of the UE 115-d or the beam 405 used by base station 105-d may be exchange via communication link 415, which may be a backhaul link. In these cases, a beam correspondence between the UE 115-d and its base station 105-d for serving cell 401 may be utilized such that UE 115-d monitors for signals from base station 105-d only. This may simplify the UE 115-d complexity when determining parameters for transmission of the UPRS.

In some cases, the beam correspondence configuration may also indicate to the UE 115-d a threshold signal strength or number of signals to transmit for a set of received synchronization signals. For example, the beam correspondence configuration may indicate for the UE 115-d to select a maximum number of UPRS to transmit, where the selected number of UPRS is associated with a minimum signal strength of received synchronization signals. The synchronization signals may be transmitted from base station 105-d, neighbor base station 105-e, or a combination thereof. Upon receipt of the synchronization signal(s), the UE 115-d may determine that the received power level of the synchronization signal(s) meets the threshold indicated by the beam correspondence configuration, and may subsequently determine the beams 410 used for reception of the synchronization signal(s). Based on the beam correspondence, the UE 115-d may determine the beams 410 to be used for transmission of one or more UPRSs. In the case where the beam correspondence configuration is different for multiple base stations 105, no coordination between the base stations 105-d and 105-e may be performed. Thus, the UE 115-d may transmit UPRS on respective beams 410 according to multiple beam correspondence configurations.

Additionally or alternatively, the beam correspondence may indicate to the UE 115-d to select a set of synchronization signals that meet a threshold, and to transmit a UPRS using beams 410 that correspond to beams 410 used for reception of the synchronization signals that meet the threshold. In such cases, the UE 115-d may transmit a UPRS using one or more beams 410 based on whether the synchronization signals meet or exceed the threshold.

Figure 5:
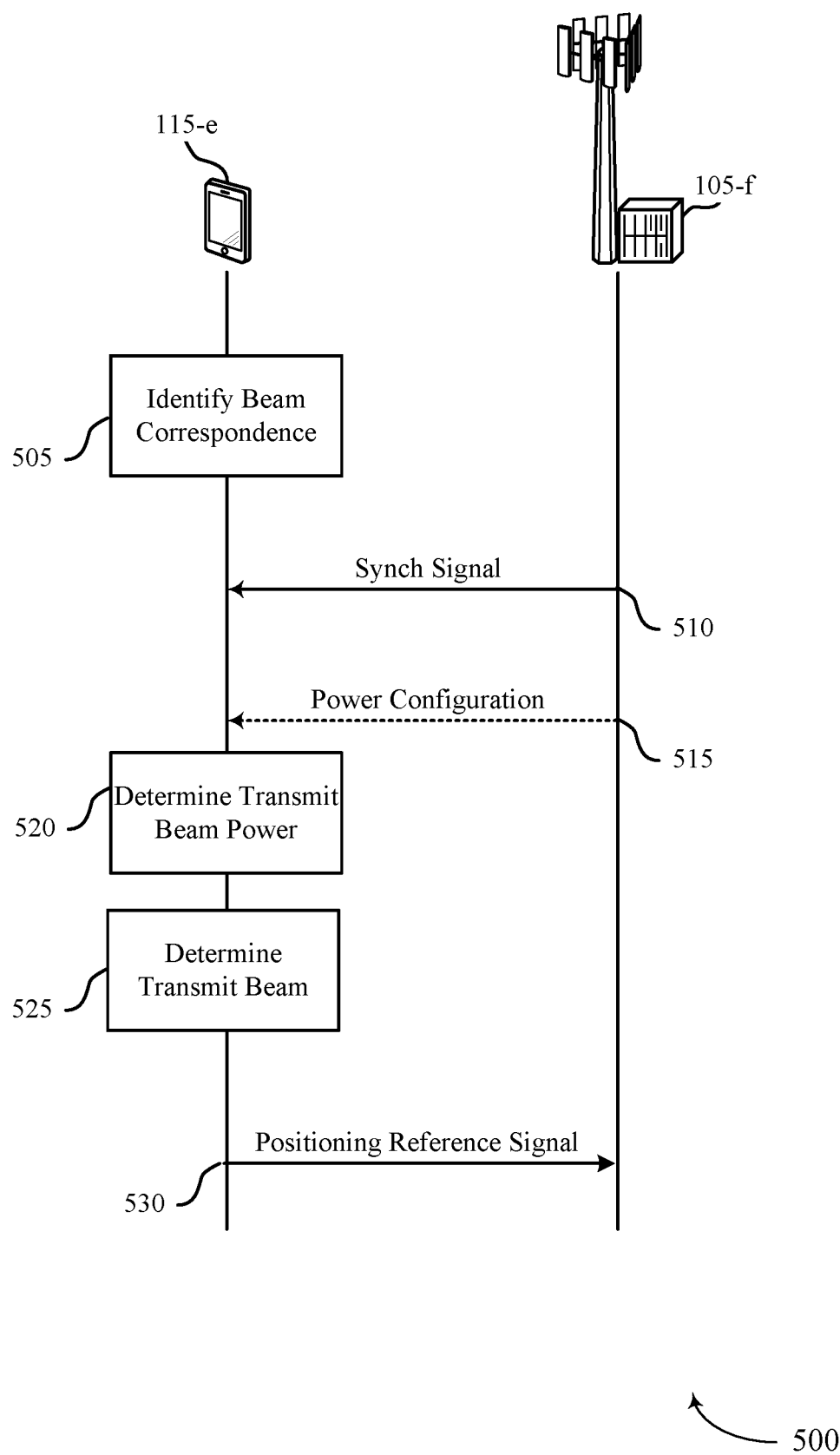
FIG. 5 illustrates an example of a process flow that supports uplink-based positioning reference signaling in multi-beam systems in accordance with aspects of the present disclosure.

FIG. 5 illustrates an example process flow 500 that supports uplink-based positioning reference signaling in multi-beam systems in accordance with various aspects of the present disclosure. In some examples, process flow 500 may implement aspects of wireless communications system 100, 200, 300, or 400 as described with reference to FIGS. 1 through 4.

At 505, the UE 115-e may identify a beam correspondence between a set of synchronization signals and an uplink positioning reference signal, where the set of synchronization signals may be transmitted by the base station 105-f. The beam correspondence may be indicated by a beam correspondence configuration, which may be transmitted from the base station 105-f.

At 510, the UE 115-e may receive a synchronization signal from the base station 105-f via one or more receive beams. For example, the UE 115-e may receive one or more synchronization signals from the base station 105-f and may measure the synchronization signals received using different receive beams.

Optionally, at 515, the UE 115-e may receive, from base station 105-f, a power offset configuration which may indicate a power offset to be used for transmission of the UPRS. In some examples, the power configuration may be transmitted in system information.

At 520, the UE 115-e may determine a transmit beam power for a UPRS. The transmit beam power may be determined from the received power configuration (e.g., transmitted by the base station 105-f at 515). Alternatively, the transmit beam power may be determined based on received synchronization signals or the power offset may be frequency band dependent and or duplexing mode dependent. For instance, the UE 115-e may measure the received power for one or more synchronization signals and determine a transmission power for the UPRS based on the measurements.

At 525, the UE 115-e may determine a transmit beam for the UE 115-e to use to transmit the UPRS based at least in part on the received synchronization signal and the identified beam correspondence. In some embodiments, determining the transmit beam includes identifying a receive beam used for receiving the synchronization signal, and determining an uplink transmit beam that corresponds to the receive beam based on the beam correspondence.

At 530, the UE 115-e may transmit the UPRS to the base station 105-f using the determined transmit beam. In some examples, transmitting the uplink positioning reference signal includes transmitting the positioning reference signal over a plurality of transmit beams including the determined transmit beam.

Figure 6:
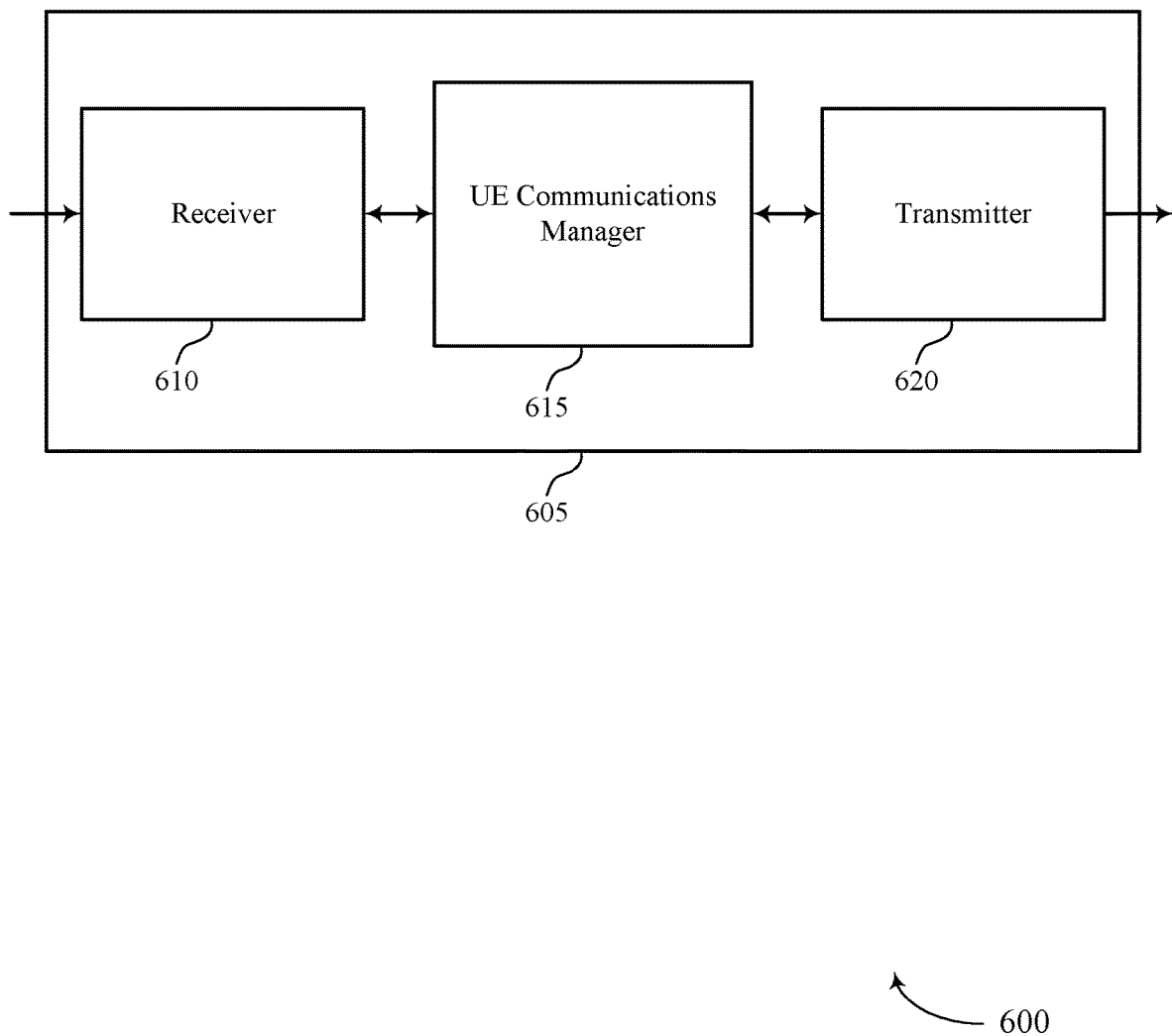
FIGS. 6 through 8 illustrate block diagrams of a device that supports uplink-based positioning reference signaling in multi-beam systems in accordance with aspects of the present disclosure.

FIG. 6 shows a block diagram 600 of a wireless device 605 that supports uplink-based positioning reference signaling in multi-beam systems in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to uplink-based positioning reference signaling in multi-beam systems, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify a beam correspondence between a set of synchronization signals and a UPRS, the set of synchronization signals transmitted by a base station and receive, from the base station, a synchronization signal at the UE. UE communications manager 615 may determine a transmit beam for the UE to use to transmit the UPRS based on the received synchronization signal and the identified beam correspondence and transmit the UPRS using the determined transmit beam.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
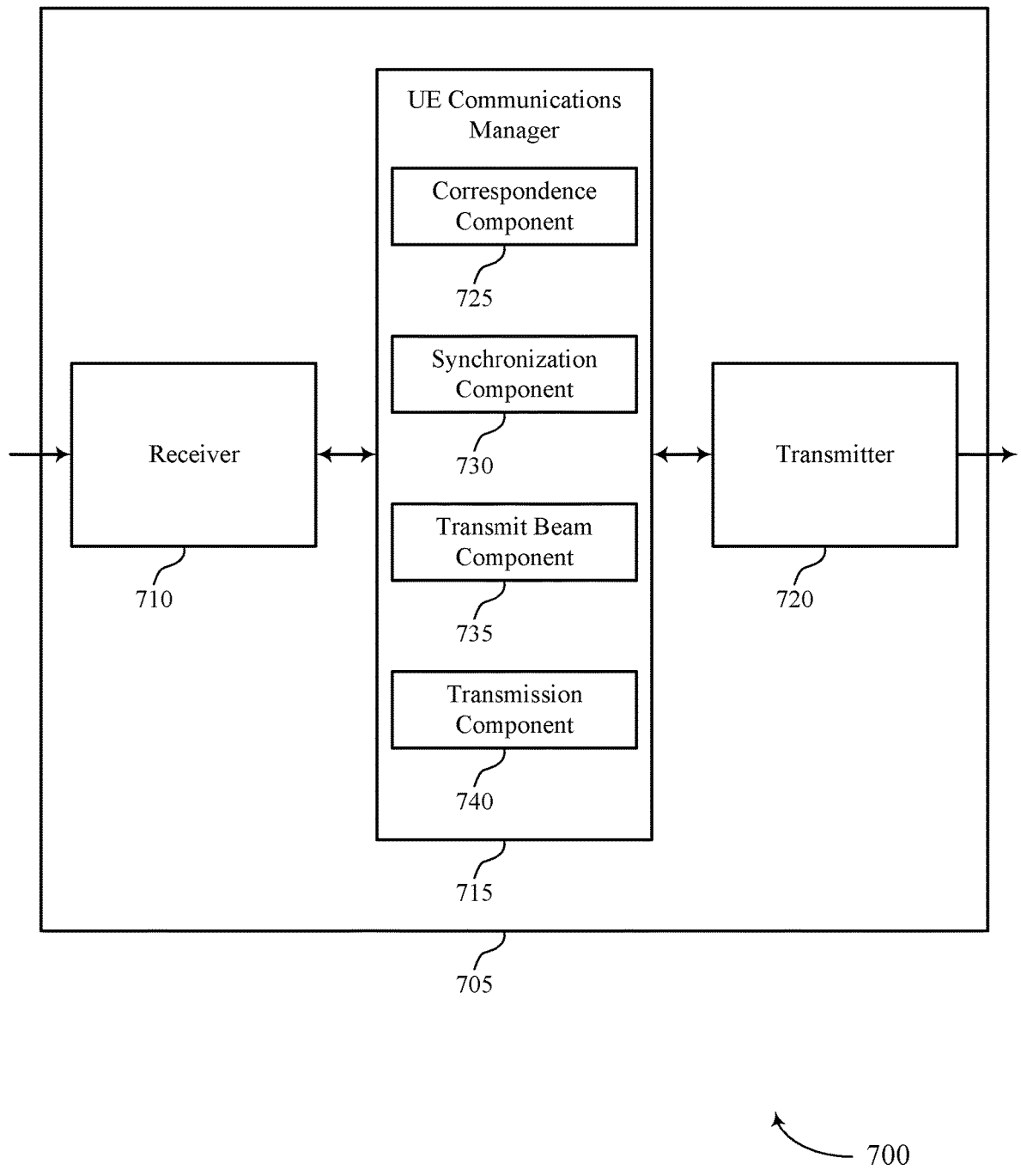

FIG. 7 shows a block diagram 700 of a wireless device 705 that supports uplink-based positioning reference signaling in multi-beam systems in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to uplink-based positioning reference signaling in multi-beam systems, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include correspondence component 725, synchronization component 730, transmit beam component 735, and transmission component 740.

Correspondence component 725 may identify a beam correspondence between a set of synchronization signals and a UPRS, the set of synchronization signals transmitted by a base station and receive, from the base station, an indication of the beam correspondence. In some cases, the indication is carried in a MIB, or a SIB, or a PDCCH, or a PDSCH, or an RRC message, or a combination thereof. In some cases, identifying the beam correspondence includes receiving, from the base station, a beam correspondence configuration that indicates the beam correspondence. In some examples, identifying the beam correspondence includes receiving beam correspondence configurations from multiple base stations, where each beam correspondence configuration indicates the beam correspondence for a respective base station of the multiple base stations.

Synchronization component 730 may receive, from the base station, a synchronization signal at the UE and measure the set of synchronization signals, where the at least one receive beam is selected based on the measurements of the set of synchronization signals. In some cases, receiving the synchronization signal includes monitoring for the synchronization signal over a set of resources corresponding to a serving cell of the UE, where the identified receive beam corresponds to the serving cell. In some examples, identifying the receive beam includes receiving the set of synchronization signals over a set of receive beams and selecting at least one receive beam from the set of receive beams. In some instances, the synchronization signal includes a PSS, or an SSS, or a PBCH, or a DMRS, or a combination thereof.

Transmit beam component 735 may determine a transmit beam for the UE to use to transmit the UPRS based on the received synchronization signal and the identified beam correspondence. In some cases, determining the transmit beam includes identifying a receive beam used for receiving the synchronization signal and determining an uplink transmit beam that corresponds to the receive beam. In some examples, determining the transmit beam includes determining time-frequency resources for the UE to use to transmit the UPRS based on the beam correspondence. In some aspects, the uplink positions reference signal is transmitted using the determined time-frequency resources.

Transmission component 740 may transmit the UPRS using the determined transmit beam. In some cases, transmitting the UPRS includes transmitting the UPRS over a set of transmit beams including the determined transmit beam. In some examples, the UPRS includes an SRS, or a PRACH, or another type of reference signal.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
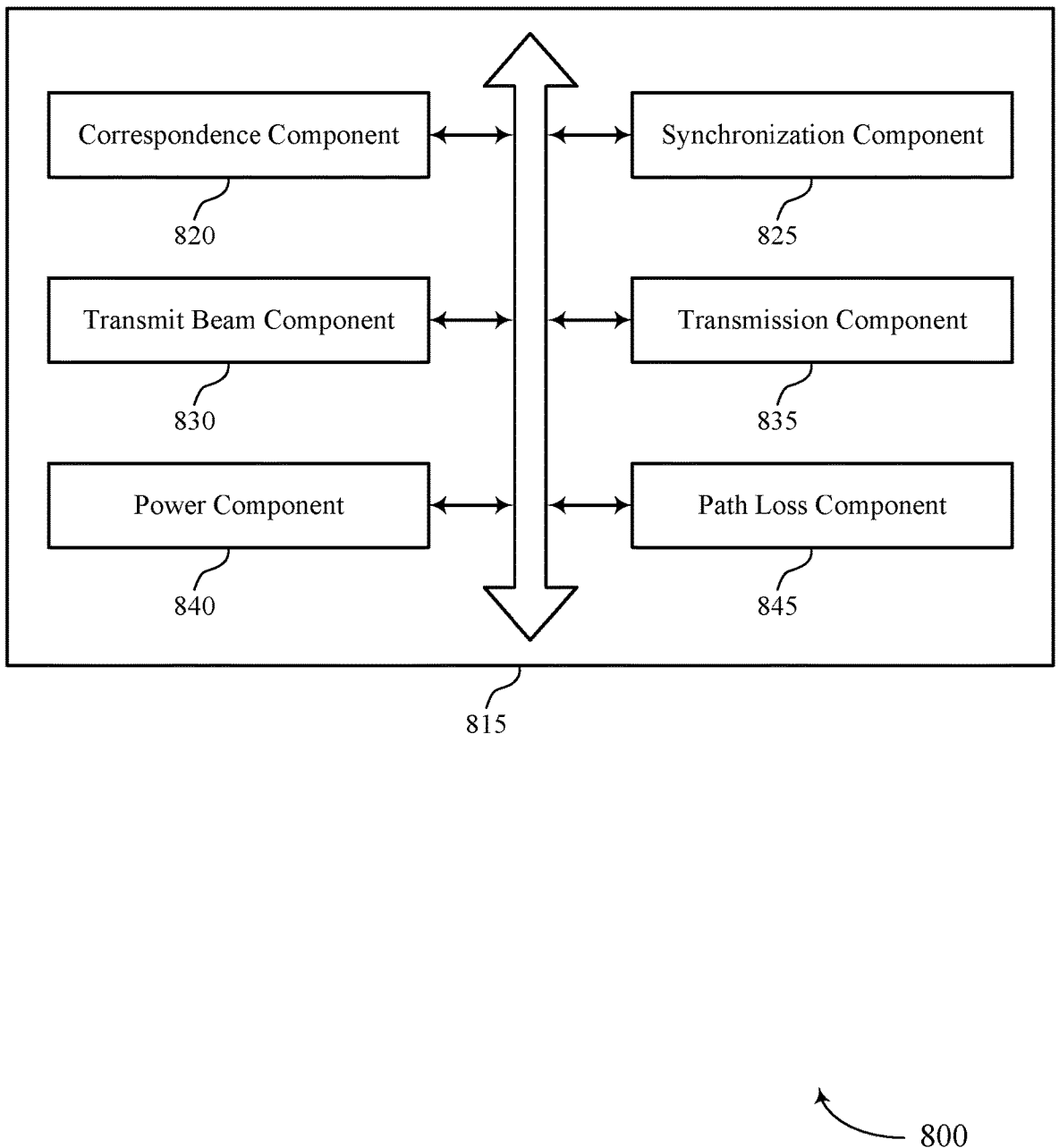

FIG. 8 shows a block diagram 800 of a UE communications manager 815 that supports uplink-based positioning reference signaling in multi-beam systems in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include correspondence component 820, synchronization component 825, transmit beam component 830, transmission component 835, power component 840, and path loss component 845. Each of these modules may communicate, directly or indirectly, with one another (e.g., via one or more buses).

Correspondence component 820 may identify a beam correspondence between a set of synchronization signals and a UPRS, the set of synchronization signals transmitted by a base station and receive, from the base station, an indication of the beam correspondence. In some examples, the indication is included within a MIB, or a SIB, or a PDCCH, or a PDSCH, or a RRC message, or a combination thereof. In some cases, identifying the beam correspondence includes receiving, from the base station, a beam correspondence configuration that indicates the beam correspondence. In some examples, identifying the beam correspondence includes receiving beam correspondence configurations from multiple base stations, where each beam correspondence configuration indicates the beam correspondence for a respective base station of the multiple base stations.

Synchronization component 825 may receive, from the base station, a synchronization signal at the UE and measure the set of synchronization signals, where the at least one receive beam is selected based on the measurements of the set of synchronization signals. In some cases, receiving the synchronization signal includes monitoring for the synchronization signal over a set of resources corresponding to a serving cell of the UE, where the identified receive beam corresponds to the serving cell. In some examples, identifying the receive beam includes receiving the set of synchronization signals over a set of receive beams and selecting at least one receive beam from the set of receive beams. In some instances, the synchronization signal includes a PSS, or a SSS, or a PBCH, or a DMRS, or a combination thereof.

Transmit beam component 830 may determine a transmit beam for the UE to use to transmit the UPRS based on the received synchronization signal and the identified beam correspondence. In some cases, determining the transmit beam includes identifying a receive beam used for receiving the synchronization signal and determining an uplink transmit beam that corresponds to the receive beam. In some aspects, determining the transmit beam includes determining time-frequency resources for the UE to use to transmit the UPRS based on the beam correspondence. In some examples, the uplink positions reference signal is transmitted using the determined time-frequency resources.

Transmission component 835 may transmit the UPRS using the determined transmit beam. In some cases, transmitting the UPRS includes transmitting the UPRS over a set of transmit beams including the determined transmit beam. In some cases, the UPRS includes an SRS, or a PRACH, or another type of reference signal.

Power component 840 may determine a transmission power for the UPRS based on the received synchronization signal, receive, from the base station, a set of power offsets for the UE, determine a transmission power for the UPRS based on the received set of power offsets, and determine a transmission power for the UPRS based on the determined path loss.

Path loss component 845 may determine a path loss based on a measurement of the received synchronization signal.

Figure 9:
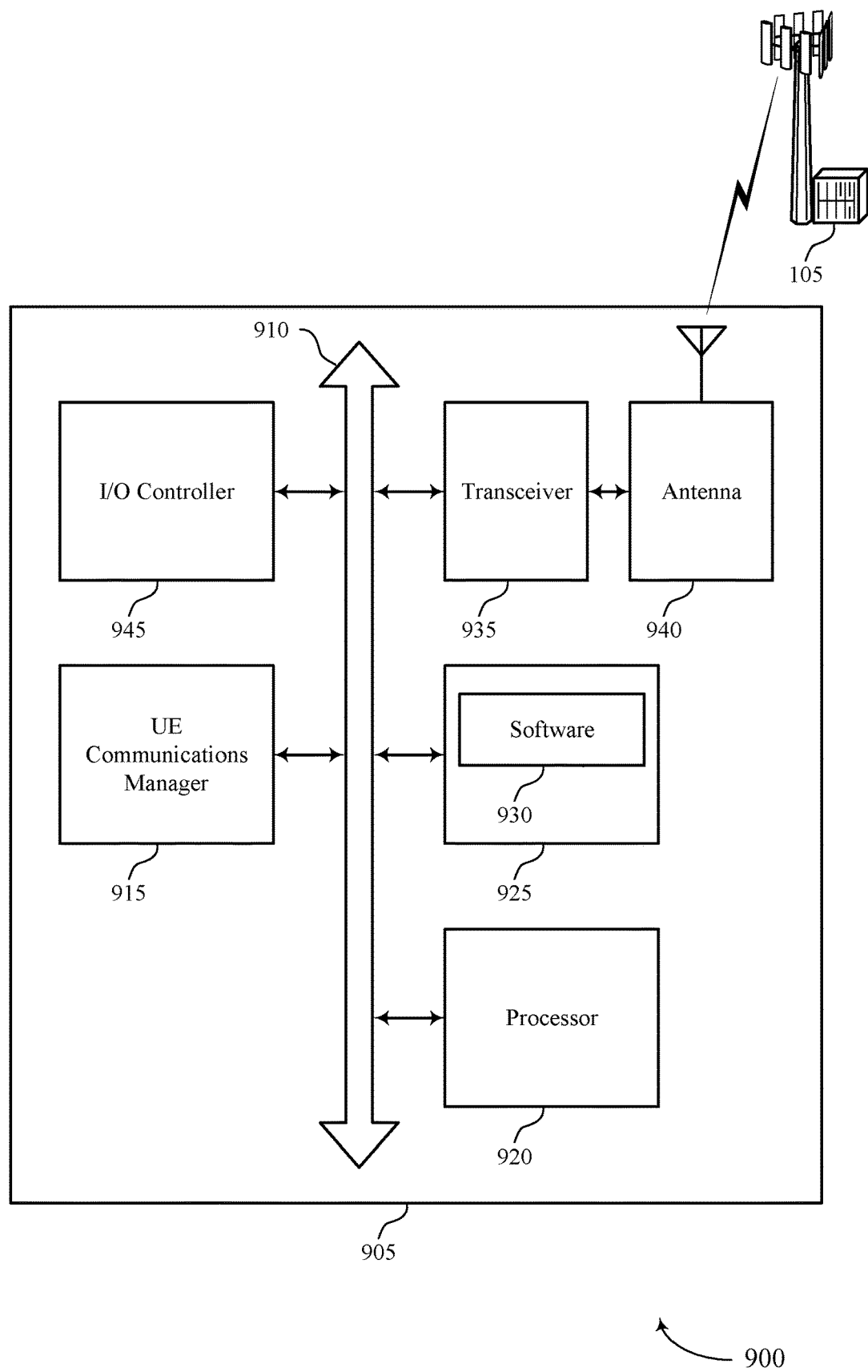
FIG. 9 illustrates a block diagram of a system including a user equipment (UE) that supports uplink-based positioning reference signaling in multi-beam systems in accordance with aspects of the present disclosure.

FIG. 9 shows a diagram of a system 900 including a device 905 that supports uplink-based positioning reference signaling in multi-beam systems in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting uplink-based positioning reference signaling in multi-beam systems).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support uplink-based positioning reference signaling in multi-beam systems. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
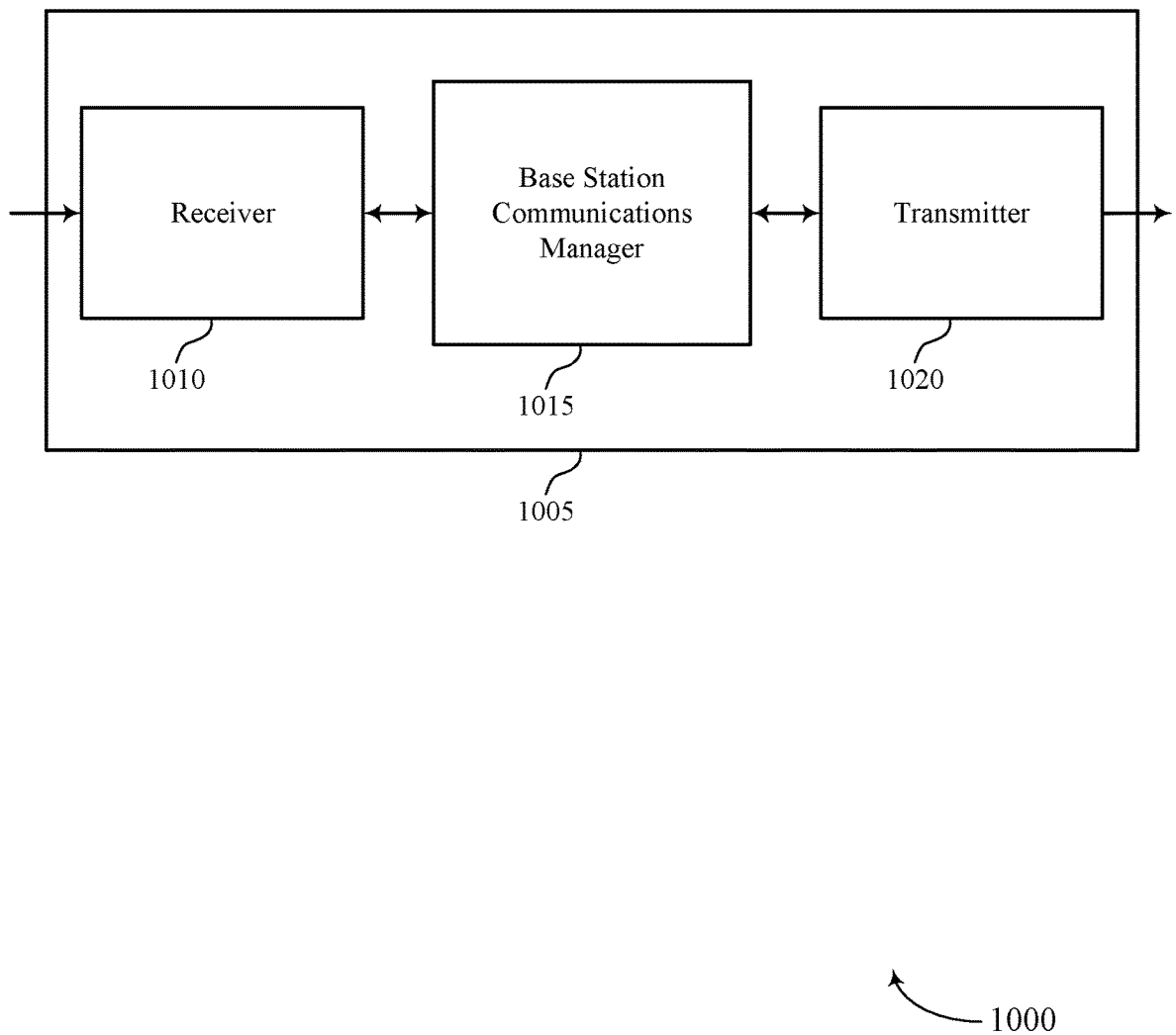
FIGS. 10 through 12 illustrate block diagrams of a device that supports uplink-based positioning reference signaling in multi-beam systems in accordance with aspects of the present disclosure.

FIG. 10 shows a block diagram 1000 of a wireless device 1005 that supports uplink-based positioning reference signaling in multi-beam systems in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink-based positioning reference signaling in multi-beam systems, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a beam correspondence between a set of synchronization signals and a UPRS, transmit an indication of the beam correspondence and transmit the set of synchronization signals using one or more transmit beams. Base station communications manager 1015 may receive the UPRS from a UE based on the transmitted indication of the beam correspondence.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
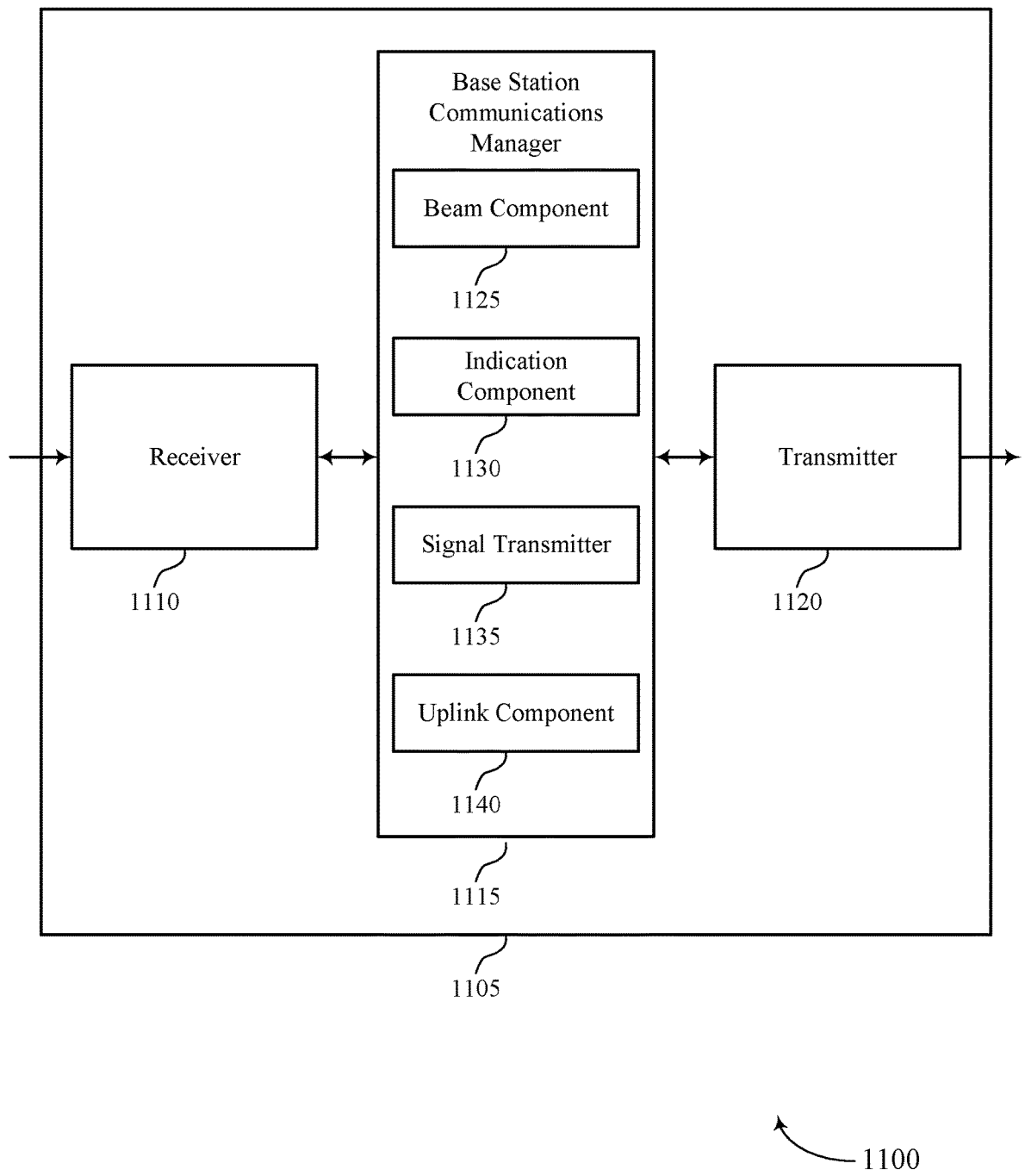

FIG. 11 shows a block diagram 1100 of a wireless device 1105 that supports uplink-based positioning reference signaling in multi-beam systems in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to uplink-based positioning reference signaling in multi-beam systems, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include beam component 1125, indication component 1130, signal transmitter 1135, and uplink component 1140.

Beam component 1125 may identify a beam correspondence between a set of synchronization signals and a UPRS.

Indication component 1130 may transmit an indication of the beam correspondence. In some cases, the indication of the beam correspondence is transmitted via a MIB, or a SIB, or a PDCCH, or a PDSCH, or an RRC message, or a combination thereof. In some examples, transmitting the indication of the beam correspondence includes transmitting the indication of the beam correspondence to a second base station.

Signal transmitter 1135 may transmit the set of synchronization signals using one or more transmit beams. In some cases, transmitting the set of synchronization signals includes transmitting the set of synchronization signals using a set of transmit beams, where the UPRS is received over a receive beam that corresponds to at least one beam of the set of transmit beams. In some examples, the set of synchronization signals includes one or more of a PSS, or an SSS, or a PBCH, or a DMRS, or a combination thereof.

Uplink component 1140 may receive the UPRS from a UE based on the transmitted indication of the beam correspondence. In some cases, receiving the UPRS includes monitoring resources that correspond to the UPRS based on the beam correspondence. In some examples, receiving the UPRS includes measuring for the UPRS across a set of receive beams based on the beam correspondence. In some aspects, the UPRS includes an SRS, or a PRACH, or another type of reference signal.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
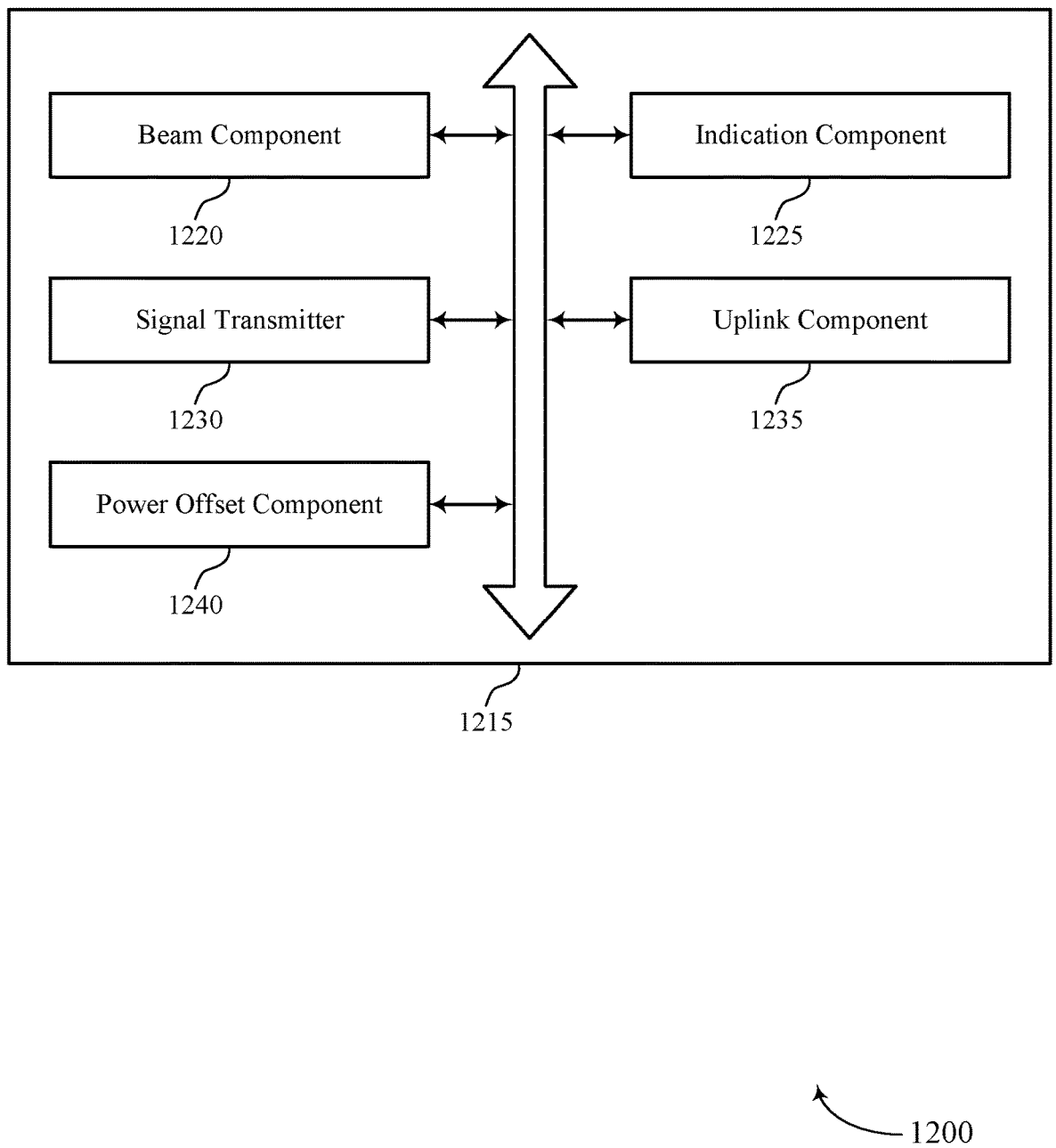

FIG. 12 shows a block diagram 1200 of a base station communications manager 1215 that supports uplink-based positioning reference signaling in multi-beam systems in accordance with aspects of the present disclosure. The base station communications manager 1215 may be an example of aspects of a base station communications manager 1315 described with reference to FIGS. 10, 11, and 13. The base station communications manager 1215 may include beam component 1220, indication component 1225, signal transmitter 1230, uplink component 1235, and power offset component 1240. Each of these modules may communicate, directly or indirectly, with one another (e.g., via one or more buses).

Beam component 1220 may identify a beam correspondence between a set of synchronization signals and a UPRS.

Indication component 1225 may transmit an indication of the beam correspondence. In some cases, the indication of the beam correspondence is transmitted via a MIB, or a SIB, or a PDCCH, or a PDSCH, or an RRC message, or a combination thereof. In some examples, transmitting the indication of the beam correspondence includes transmitting the indication of the beam correspondence to a second base station.

Signal transmitter 1230 may transmit the set of synchronization signals using one or more transmit beams. In some cases, transmitting the set of synchronization signals includes transmitting the set of synchronization signals using a set of transmit beams, where the UPRS is received over a receive beam that corresponds to at least one beam of the set of transmit beams. In some examples, the set of synchronization signals includes one or more of a PSS, or an SSS, a PBCH, or a DMRS, or a combination thereof.

Uplink component 1235 may receive the UPRS from a UE based on the transmitted indication of the beam correspondence. In some cases, receiving the UPRS includes monitoring resources that correspond to the UPRS based on the beam correspondence. In some examples, receiving the UPRS includes measuring for the UPRS across a set of receive beams based on the beam correspondence. In some aspects, the UPRS includes an SRS, or a PRACH, or another type of reference signal.

Power offset component 1240 may transmit a set of power offsets to the UE, the set of power offsets indicating a transmission power offset for the UPRS. In some cases, the set of power offsets is based on at least one of the set of synchronization signals, or a frequency band used for transmission of the UPRS, or a duplexing mode used for transmission of the UPRS, or a combination thereof. In some examples, the set of power offsets is transmitted a MIB, or a SIB, or a PDCCH, or a PDSCH, or an RRC message, or a combination thereof.

Figure 13:
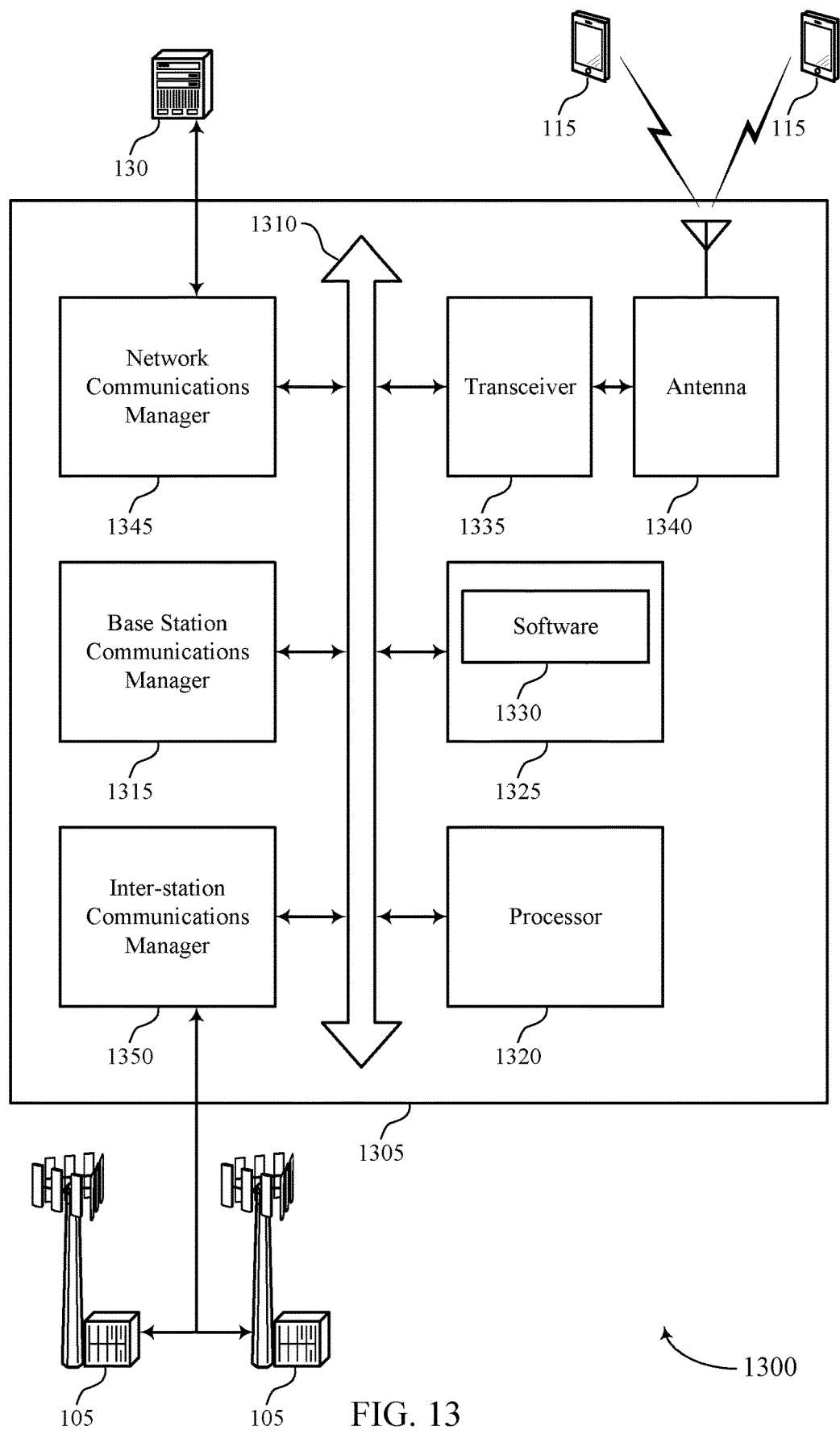
FIG. 13 illustrates a block diagram of a system including a base station that supports uplink-based positioning reference signaling in multi-beam systems in accordance with aspects of the present disclosure.

FIG. 13 shows a diagram of a system 1300 including a device 1305 that supports uplink-based positioning reference signaling in multi-beam systems in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting uplink-based positioning reference signaling in multi-beam systems).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support uplink-based positioning reference signaling in multi-beam systems. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
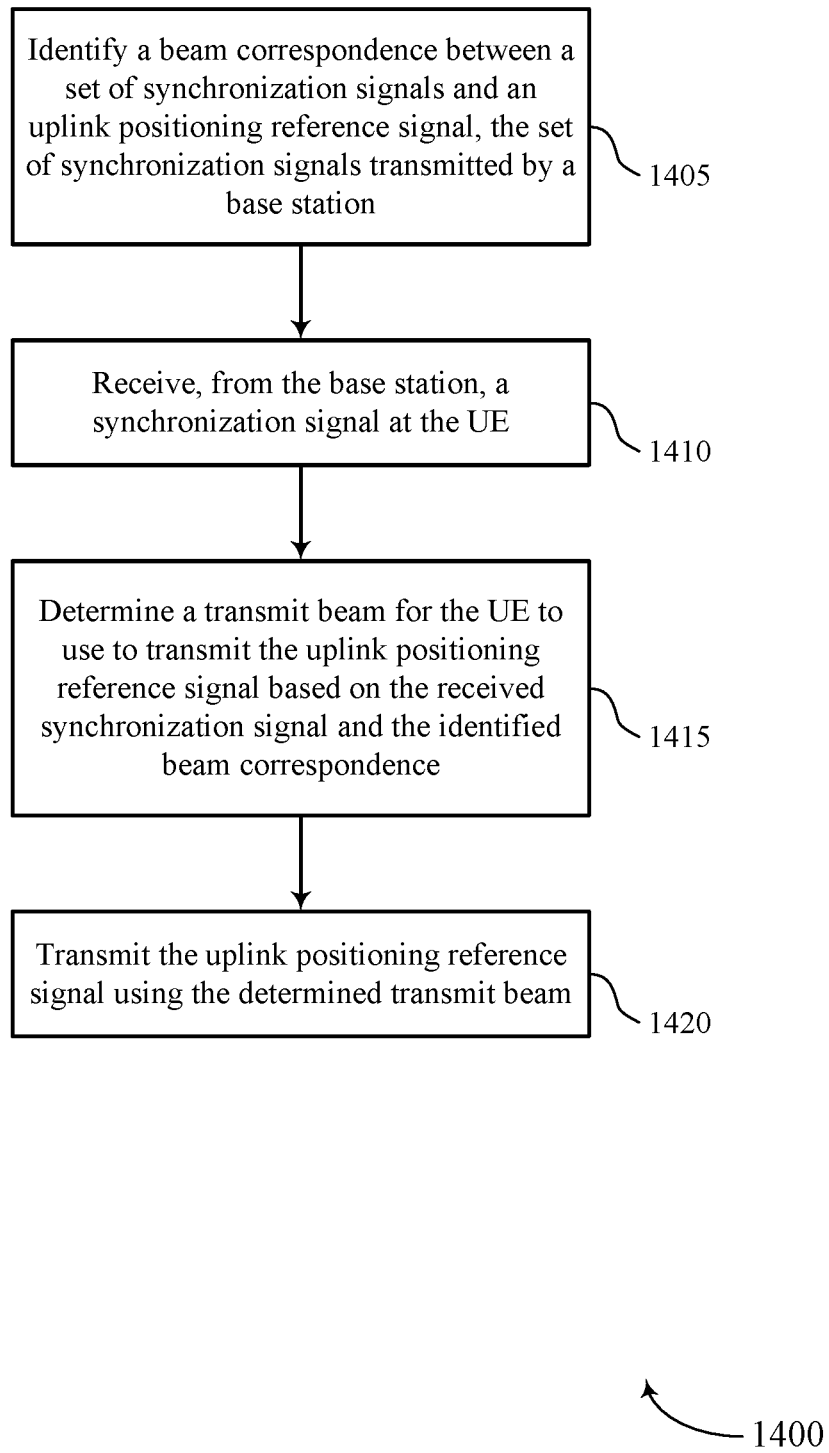
FIGS. 14 and 15 illustrate methods for uplink-based positioning reference signaling in multi-beam systems in accordance with aspects of the present disclosure.

FIG. 14 shows a flowchart illustrating a method 1400 for uplink-based positioning reference signaling in multi-beam systems in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify a beam correspondence between a set of synchronization signals and a UPRS, the set of synchronization signals transmitted by a base station. The operations of block 1405 may be performed according to the methods described herein. In certain examples, aspects of the operations of block 1405 may be performed by a correspondence component as described with reference to FIGS. 6 through 9.

At block 1410 the UE 115 may receive, from the base station, a synchronization signal at the UE. The operations of block 1410 may be performed according to the methods described herein. In certain examples, aspects of the operations of block 1410 may be performed by a synchronization component as described with reference to FIGS. 6 through 9.

At block 1415 the UE 115 may determine a transmit beam for the UE to use to transmit the UPRS based at least in part on the received synchronization signal and the identified beam correspondence. The operations of block 1415 may be performed according to the methods described herein. In certain examples, aspects of the operations of block 1415 may be performed by a transmit beam component as described with reference to FIGS. 6 through 9.

At block 1420 the UE 115 may transmit the UPRS using the determined transmit beam. The operations of block 1420 may be performed according to the methods described herein. In certain examples, aspects of the operations of block 1420 may be performed by a transmission component as described with reference to FIGS. 6 through 9.

Figure 15:
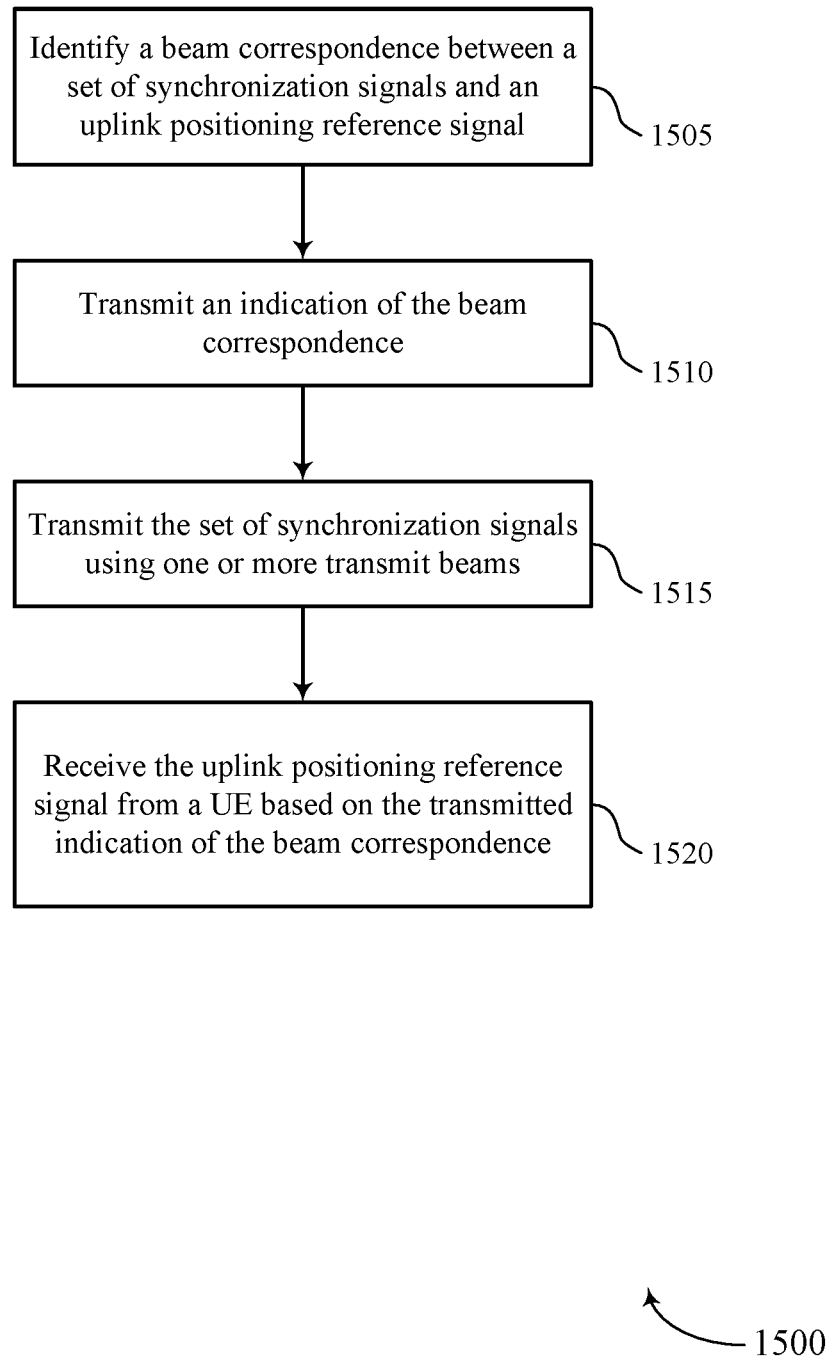

FIG. 15 shows a flowchart illustrating a method 1500 for uplink-based positioning reference signaling in multi-beam systems in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify a beam correspondence between a set of synchronization signals and a UPRS. The operations of block 1505 may be performed according to the methods described herein. In certain examples, aspects of the operations of block 1505 may be performed by a beam component as described with reference to FIGS. 10 through 13.

At block 1510 the base station 105 may transmit an indication of the beam correspondence. The operations of block 1510 may be performed according to the methods described herein. In certain examples, aspects of the operations of block 1510 may be performed by an indication component as described with reference to FIGS. 10 through 13.

At block 1515 the base station 105 may transmit the set of synchronization signals using one or more transmit beams. The operations of block 1515 may be performed according to the methods described herein. In certain examples, aspects of the operations of block 1515 may be performed by a signal transmitter as described with reference to FIGS. 10 through 13.

At block 1520 the base station 105 may receive the UPRS from a UE based at least in part on the transmitted indication of the beam correspondence. The operations of block 1520 may be performed according to the methods described herein. In certain examples, aspects of the operations of block 1520 may be performed by a uplink component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a beam correspondence between a set of synchronization signals and an uplink positioning reference signal, the set of synchronization signals transmitted by a base station;
   receiving, from the base station, a synchronization signal at the UE;
   determining a transmit beam for the UE to use to transmit the uplink positioning reference signal based at least in part on the received synchronization signal and the identified beam correspondence; and
   transmitting the uplink positioning reference signal using the determined transmit beam.

2. The method of claim 1, wherein identifying the beam correspondence comprises:
   receiving, from the base station, a beam correspondence configuration that indicates the beam correspondence.

3. The method of claim 1, wherein identifying the beam correspondence comprises:
   receiving beam correspondence configurations from multiple base stations, wherein each beam correspondence configuration indicates the beam correspondence for a respective base station of the multiple base stations.

4. The method of claim 1, further comprising:
   determining a transmission power for the uplink positioning reference signal based at least in part on the received synchronization signal.

5. The method of claim 1, wherein determining the transmit beam comprises:
   identifying a receive beam used for receiving the synchronization signal; and
   determining an uplink transmit beam that corresponds to the receive beam.

6. The method of claim 5, wherein receiving the synchronization signal comprises:
   monitoring for the synchronization signal over a set of resources corresponding to a serving cell of the UE, wherein the identified receive beam corresponds to the serving cell.

7. The method of claim 5, wherein identifying the receive beam comprises:
   receiving the set of synchronization signals over a set of receive beams and selecting at least one receive beam from the set of receive beams.

8. The method of claim 7, further comprising:
   measuring the set of synchronization signals, wherein the at least one receive beam is selected based at least in part on the measurements of the set of synchronization signals.

9. The method of claim 1, further comprising:
   receiving, from the base station, a set of power offsets for the UE; and
   determining a transmission power for the uplink positioning reference signal based at least in part on the received set of power offsets.

10. The method of claim 1, further comprising:
    determining a path loss based at least in part on a measurement of the received synchronization signal; and
    determining a transmission power for the uplink positioning reference signal based at least in part on the determined path loss.

11. The method of claim 1, wherein transmitting the uplink positioning reference signal comprises:
    transmitting the uplink positioning reference signal over a plurality of transmit beams including the determined transmit beam.

12. The method of claim 1, wherein determining the transmit beam comprises:
    determining time-frequency resources for the UE to use to transmit the uplink positioning reference signal based at least in part on the beam correspondence, the uplink positions reference signal transmitted using the determined time-frequency resources.

13. The method of claim 1, further comprising:
    receiving, from the base station, an indication of the beam correspondence, wherein the indication is carried in a master information block (MIB), or a system information block (SIB), or a physical downlink control channel (PDCCH), or a physical downlink shared channel (PDSCH), or a radio resource control (RRC) message, or a combination thereof.

14. The method of claim 1, wherein the synchronization signal comprises a primary synchronization signal (PSS), or a secondary synchronization signal (SSS), or a physical broadcast channel (PBCH), or a demodulation reference signal (DMRS), or a combination thereof.

15. The method of claim 1, wherein the uplink positioning reference signal comprises a sounding reference signal, or a physical random access channel (PRACH), or another type of reference signal.

16. A method for wireless communication at a base station, comprising:
    identifying a beam correspondence between a set of synchronization signals and an uplink positioning reference signal;

transmitting an indication of the beam correspondence;
transmitting the set of synchronization signals using one or more transmit beams; and
receiving the uplink positioning reference signal from a user equipment (UE) based at least in part on the transmitted indication of the beam correspondence.

17. The method of claim 16, wherein transmitting the set of synchronization signals comprises:
transmitting the set of synchronization signals using a set of transmit beams, wherein the uplink positioning reference signal is received over a receive beam that corresponds to at least one beam of the set of transmit beams.

18. The method of claim 16, wherein receiving the uplink positioning reference signal comprises:
monitoring resources that correspond to the uplink positioning reference signal based at least in part on the beam correspondence.

19. The method of claim 16, wherein receiving the uplink positioning reference signal comprises:
measuring for the uplink positioning reference signal across a set of receive beams based at least in part on the beam correspondence.

20. The method of claim 16, wherein the indication of the beam correspondence is transmitted via a master information block (MIB), or a system information block (SIB), or a physical downlink control channel (PDCCH), or a physical downlink shared channel (PDSCH), or a radio resource control (RRC) message, or a combination thereof.

21. The method of claim 16, further comprising:
transmitting a set of power offsets to the UE, the set of power offsets indicating a transmission power offset for the uplink positioning reference signal.

22. The method of claim 21, wherein the set of power offsets is based at least in part on at least one of the set of synchronization signals, or a frequency band used for transmission of the uplink positioning reference signal, or a duplexing mode used for transmission of the uplink positioning reference signal, or a combination thereof.

23. The method of claim 21, wherein the set of power offsets is transmitted via a master information block (MIB), or a system information block (SIB), or a physical downlink control channel (PDCCH), or a physical downlink shared channel (PDSCH), or a radio resource control (RRC) message, or a combination thereof.

24. The method of claim 16, wherein the set of synchronization signals comprises a primary synchronization signal (PSS), or a secondary synchronization signal (SSS), or a physical broadcast channel (PBCH), or a demodulation reference signal (DMRS), or a combination thereof.

25. The method of claim 16, wherein transmitting the indication of the beam correspondence comprises:
transmitting the indication of the beam correspondence to a second base station.

26. The method of claim 16, wherein the uplink positioning reference signal comprises a sounding reference signal, or a physical random access channel (PRACH), or another type of reference signal.

27. An apparatus for wireless communication at a user equipment (UE), comprising:
a processor, memory in electronic communication with the processor; and
instructions stored in the memory and executable by the processor to cause the apparatus to:
identify a beam correspondence between a set of synchronization signals and an uplink positioning reference signal, the set of synchronization signals transmitted by a base station;
receive, from the base station, a synchronization signal at the UE;
determine a transmit beam for the UE to use to transmit the uplink positioning reference signal based at least in part on the received synchronization signal and the identified beam correspondence; and
transmit the uplink positioning reference signal using the determined transmit beam.

28. The apparatus of claim 27, wherein the instructions to identify the beam correspondence are executable by the processor to cause the apparatus to:
receive, from the base station, a beam correspondence configuration that indicates the beam correspondence.

29. An apparatus for wireless communication at a base station, comprising:
a processor, memory in electronic communication with the processor; and
instructions stored in the memory and executable by the processor to cause the apparatus to:
identify a beam correspondence between a set of synchronization signals and an uplink positioning reference signal;
transmit an indication of the beam correspondence;
transmit the set of synchronization signals using one or more transmit beams; and
receive the uplink positioning reference signal from a user equipment (UE) based at least in part on the transmitted indication of the beam correspondence.

30. The apparatus of claim 29, wherein the instructions to transmit the set of synchronization signals are executable by the processor to cause the apparatus to:
transmit the set of synchronization signals using a set of transmit beams, wherein the uplink positioning reference signal is received over a receive beam that corresponds to at least one beam of the set of transmit beams.

\* \* \* \* \*